US012811797B1

(12) United States Patent
Sekhar

(10) Patent No.: US 12,811,797 B1
(45) Date of Patent: Nov. 24, 2026

(54) METHODS AND SYSTEMS FOR OUTSOURCING DECISION-TREE INFERENCE WHILE OBFUSCATING DECISION-TREE ATTRIBUTES

(71) Applicant: Pantherun Technologies Private Limited, Bangalore (IN)

(72) Inventor: Srinivas Lakshman Sekhar, Bangalore (IN)

(73) Assignee: Pantherun Technologies Private Limited, Bangalore (IN)

( * ) Notice: Subject to any disclaimer, the term of this patent is extended or adjusted under 35 U.S.C. 154(b) by 0 days.

(21) Appl. No.: 19/432,622

(22) Filed: Dec. 24, 2025

(30) Foreign Application Priority Data

Jun. 24, 2025 (IN) ............................ 202541060276

(51) Int. Cl.
*H04L 9/32* (2006.01)
*H04L 9/08* (2006.01)

(52) U.S. Cl.
CPC ............ *H04L 9/3236* (2013.01); *H04L 9/085* (2013.01); *H04L 9/0869* (2013.01)

(58) Field of Classification Search
CPC ..... H04L 9/085; H04L 9/0869; H04L 9/3236; G06F 21/6245; G06N 20/00
See application file for complete search history.

(56) References Cited

U.S. PATENT DOCUMENTS

| | | | | |
|---|---|---|---|---|
| 2020/0005180 | A1* | 1/2020 | Fritchman | H04L 9/008 |
| 2020/0242466 | A1* | 7/2020 | Mohassel | G06N 3/048 |
| 2022/0148691 | A1* | 5/2022 | Katouzian | G16H 70/60 |
| 2024/0013034 | A1* | 1/2024 | Li | G06N 3/048 |
| 2025/0254031 | A1* | 8/2025 | Tajima | H04L 9/085 |

FOREIGN PATENT DOCUMENTS

| | | |
|---|---|---|
| CN | 115842627 A | 3/2023 |
| CN | 117634598 A | 3/2024 |

OTHER PUBLICATIONS

Yuan et al., "OnePath: Efficient and Privacy-Preserving Decision Tree Inference in the Cloud," Jul. 21, 2025 (Year: 2025).*

(Continued)

*Primary Examiner* — Jeremy S Duffield
(74) *Attorney, Agent, or Firm* — Barta Jones, PLLC

(57) ABSTRACT

Methods and systems for outsourcing decision tree inference while obfuscating decision tree attributes is provided. Embodiments provide privacy-preserving outsourced decision tree classification frameworks that incorporate an attribute-hiding mechanism to obfuscate attributes of nodes of a decision tree model, which is to be inferred for classification task based on a query data. Embodiments provide the frameworks that ensures robust protection of the attributes of the decision tree model, address transmission overhead issues associated with transmission of a share of the query data from a first device to a second device (by employing a seed-based pseudorandom generator for compressing the share of the query data), ensure enhanced privacy for users, and improve scalability for practical deployment of the frameworks in resource-constrained environments.

26 Claims, 14 Drawing Sheets

(56) References Cited

OTHER PUBLICATIONS

Y. Zheng, H. Duan, C. Wang, R. Wang and S. Nepal, "Securely and Efficiently Outsourcing Decision Tree Inference," in IEEE Transactions on Dependable and Secure Computing, vol. 19, No. 3, pp. 1841-1855, May 1-Jun. 2022 (Year: 2022).*

Y. Zheng, C. Wang, R. Wang, H. Duan and S. Nepal, "Optimizing Secure Decision Tree Inference Outsourcing," in IEEE Transactions on Dependable and Secure Computing, vol. 20, No. 4, pp. 3079-3092, Jul. 1-Aug. 2023 (Year: 2023).*

Fukui et al., "Efficient and Privacy-Preserving Decision Tree Inference via Homomorphic Matrix Multiplication and Leaf Node Pruning," May 2025, Applied Sciences (Year: 2025).*

Indian Patent Office, First Examination Report issued for Indian Application No. 202541060276 on Aug. 22, 2024, pp. 11.

* cited by examiner

METHODS AND SYSTEMS FOR OUTSOURCING DECISION-TREE INFERENCE WHILE OBFUSCATING DECISION-TREE ATTRIBUTES

FIELD OF TECHNOLOGY

The present disclosure relates to outsourcing of inferencing of decision-tree classification models. Specifically, the present disclosure relates to a method and a system for securely outsourcing inference of a decision tree classification model while obfuscating attributes of the decision tree classification model during inference.

BACKGROUND

The rapid growth of machine learning applications has led to the widespread adoption of decision tree classification systems. The decision tree classification systems are valued for their interpretability, efficiency, and ability to handle both classification and regression tasks. In addition, the decision tree classification systems are particularly useful in scenarios where computational resources are limited, such as user/edge devices in Internet of Things (IoT) environments. For instance, necessitated by one or more of computational limitations and storage limitations of an edge device, decision tree inference may be outsourced to a cloud-based service provider. However, outsourcing of the decision tree inference to the cloud-based service provider for obtaining a classification result may introduce significant privacy concerns. Both user's data and a model owner's proprietary decision tree model is required to be protected from unauthorized access.

To address the privacy concerns, privacy-preserving outsourced decision tree classification model frameworks have been proposed. These frameworks may employ secret sharing and pseudorandom generators to enable secure and efficient decision tree inference. The frameworks may also ensure succinct communication between entities involved in the decision tree inference, such as decision tree model owners, cloud service providers, and user/edge devices, while optimizing storage costs through a pseudorandom generator-based decision tree compression techniques. The frameworks have demonstrated outstanding performance in terms of communication complexity, storage efficiency, computational overhead, and so on, making them a promising candidate for usage in privacy-preserving machine learning.

However, despite having numerous advantages, the privacy-preserving outsourced decision tree classification model frameworks have critical limitations. These include a requirement of transmission of query data shares from the user/edge devices to the cloud service providers, which may incur a communication overhead proportional to the size of a query data (whose shares are transmitted). This overhead can hinder scalability, particularly in scenarios where a large dataset is involved or when network bandwidth is limited. Furthermore, these frameworks are so designed that attributes in nodes of a decision tree model are stored in plaintext in cloud service provider devices or user/edge devices, thereby creating a risk of attribute leakage. This vulnerability allows unauthorized parties to infer sensitive information about the decision tree model, potentially compromising the model owner's intellectual property.

Therefore, in light of the foregoing discussion, there exists a need to overcome the aforementioned drawbacks associated with existing privacy-preserving outsourced decision tree classification model frameworks.

SUMMARY

The present disclosure provides devices, methods and systems for outsourcing decision tree inference and obfuscating decision tree attributes during decision tree inference. The present disclosure offers comprehensive solutions for privacy-preserving outsourced decision tree classification. The methods and systems ensure enhanced security, reduced communication costs, and improved performance, making them ideal for deployment in resource-constrained environments and large-scale applications. Embodiments incorporate attribute-hiding techniques for obfuscation attributes of a decision tree model and protection from unauthorized access of the decision tree model. In addition, embodiments employ an efficient dot-product-based obfuscation technique to obfuscate the attributes of the decision tree model. The attribute-hiding techniques ensure robust protection of model attributes, preventing unauthorized access and inference. In addition to addressing attribute leakage, embodiments also leverage a seed-based pseudorandom generator to compress query data shares, leading to minimization of transmission overhead. This approach significantly reduces transmission, thereby improving scalability and practicality of the methods and systems.

The aim of the present disclosure is achieved by the provided devices (such as a first device, a second device, and a third device), methods, and systems for outsourcing the decision tree inference and obfuscating decision tree attributes during the decision tree inference, as defined in the appended independent claims (such as the independent claims 1, 13, 14, 15, 16, 26, 27, and 28) to which reference is made to. Advantageous features are set out in the appended dependent claims.

It has to be noted that all devices, elements, processors, units, and modules described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features, and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not too scaled. Wherever possible, like elements have been indicated by identical numbers.

Embodiments of the present disclosure will now be described, by way of example, with reference to the following diagrams, wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF THE DISCLOSURE

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
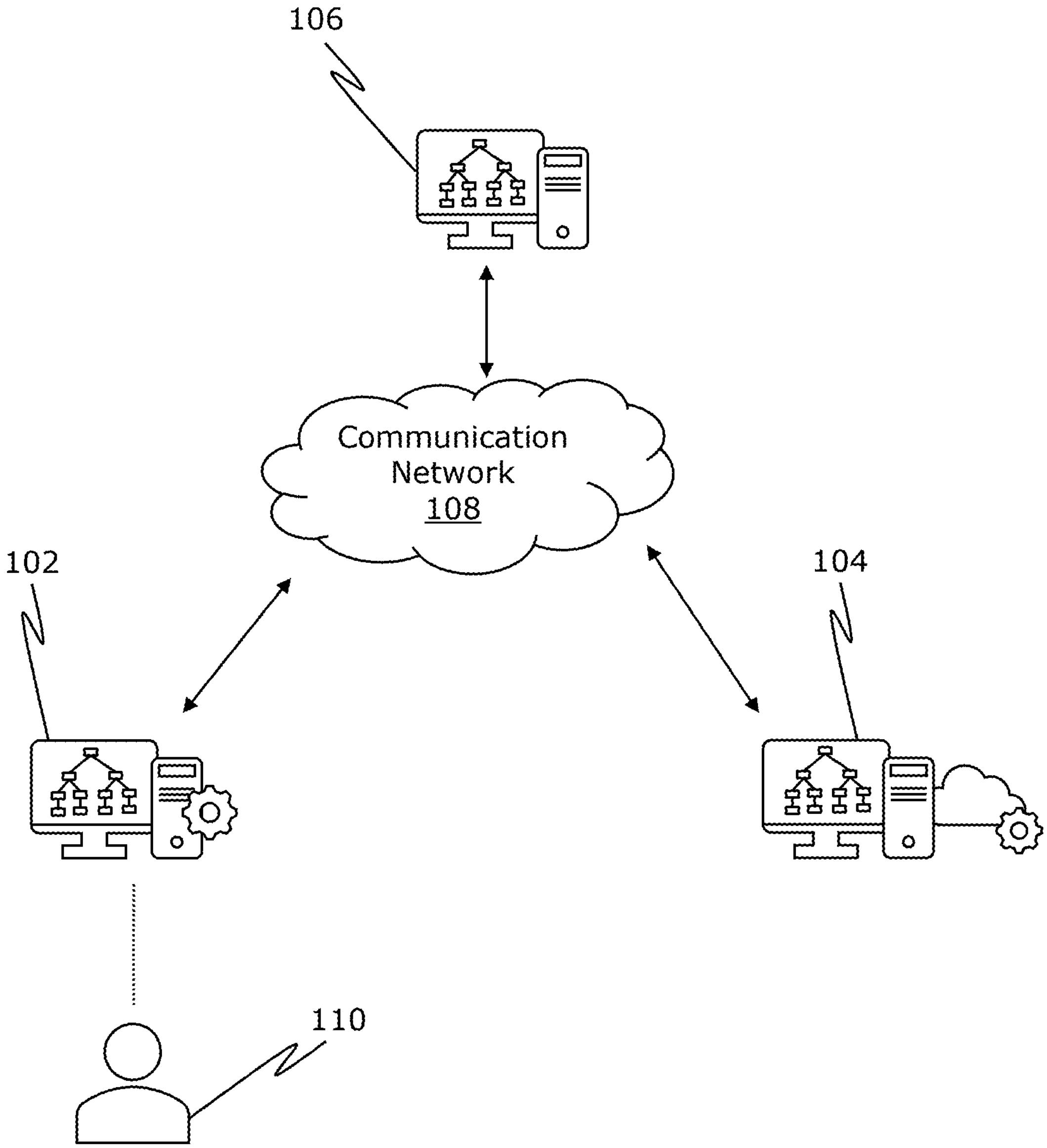
FIG. 1 illustrates an exemplary networking environment for implementing outsourcing of inference of a decision tree model and obfuscating attributes of the decision tree model during the inference, in accordance with an embodiment of the present disclosure.

FIG. 1 illustrates an exemplary networking environment 100 for implementing outsourcing of inference of a decision tree model and obfuscating attributes of the decision tree model during the inference, in accordance with an embodiment of the present disclosure. With reference to FIG. 1, there is shown the networking environment 100. The networking environment 100 includes a set of entities. The set of entities include a first device 102, a second device 104, and a third device 106. The first device 102, the second device 104, and the third device 106 may communicate with each other via a communication network 108. The third device 106 functions as a model owner as that owns a decision tree classification model. The first device 102 is a user device associated with a user 110. The first device 102 generates query data using which inference of the decision tree classification model is to be carried out. The first device 102 outsources inference of the decision tree classification model to the second device 104. The second device 104 functions as a service provider device that performs a majority of computations involved in inferencing the decision tree classification model, leading to generation of a decision tree classification result with respect to the query data.

The communication network 108 includes a medium (such as a communication channel) through which the set of entities (i.e., the first user device 102, the second user device 104, and the third user device 106) communicate with each other. The communication network 108 may be a wired/wireless network. Examples of the communication network 108 may include, but are not limited to, a local area network (LAN), a wireless personal area network (WPAN), a wireless local area network (WLAN), a wireless wide area network (WWAN), a cloud network, a long-term evolution (LTE) network, a New Radio (NR) network, a metropolitan area network (MAN), and/or Internet.

The second device 104, for example, a cloud service provider (CSP), may handle most of the computations for generating the decision tree classification result. The first device 102, i.e., the user device, has limited computational and storage resources. Hence, the first device 102 outsources classification tasks associated with inferencing of the decision tree classification model to the second device 104 by leveraging robust and low-latency infrastructure of the communication network 108. The first device 104 cooperates with the CSP for generation of the decision tree classification result. Examples of the first device 102 include, but are not limited to, a smartphone, a desktop, a laptop, a tablet, a smart watch, a smart camera, a home security system, a smart thermostat, a smart lighting system, a fitness tracker, a smart meter, a health monitoring device, a quality control system, and so on.

The present disclosure presents two embodiments for outsourcing inference of the decision tree classification model while attributes associated with nodes of the decision tree classification model are obfuscated. A discussion of a first embodiment of the two embodiments follows.

First Embodiment

As mentioned previously, the third device 106, i.e., the model owner, owns a trained decision tree classification model. Each non-leaf node of the decision tree classification model is associated with an attribute field, a hash value of the attribute field, and a threshold. The hash value is obtained by applying a hash function on the attribute field.

Additionally, each leaf node of the decision tree classification model is associated with a label. The third device 106 splits the decision tree classification model to generate a first share of the decision tree classification model and a second share of the decision tree classification model. The splitting of the decision tree classification model causes both hash values of attribute fields and thresholds associated with non-leaf nodes of the decision tree classification model to be split. For instance, a sum of a first share of a hash value of an attribute field/threshold associated with a non-leaf node in the first share of the decision tree classification model and a second share of the hash value of the attribute field/threshold associated with a corresponding non-leaf node in the second share of the decision tree classification model is equal to a threshold of a non-leaf node of the decision tree classification model. The splitting also causes labels associated with leaf nodes of the decision tree classification model to be split. For instance, a sum of a first share of a label associated with a leaf node in the first share of the decision tree classification model and a second share of the label associated with a corresponding leaf node in the second share of the decision tree classification model is equal to a label of a leaf node of the decision tree classification model. Hereinafter, for simplicity, the decision tree classification model will be referred to as the decision tree.

The third device 106 transmits a seed to the first device 102. The seed enables the first device 102 to compute both first shares of hash values of attribute fields associated with non-leaf nodes of the first share of the decision tree, thresholds associated with the non-leaf nodes of the first share of the decision tree, and first shares of labels associated with leaf nodes of the first share of the decision tree. This allows minimizing communication overhead which would otherwise have been involved in transmissions of the first shares of the hash values of the attribute fields associated with the non-leaf nodes, the first shares of the thresholds associated with the non-leaf nodes, and the first shares of the labels associated with the leaf nodes to the first device 102. The third device 106 further transmits the second share of the decision tree to the second device 104. The transmission includes second shares of the hash values of the attribute fields associated with corresponding non-leaf nodes of the second share of the decision tree, second shares of the thresholds associated with the corresponding non-leaf nodes of the second share of the decision tree, and second shares of the labels associated with the corresponding leaf nodes of the second share of the decision tree.

The first device 102 generates a hash vector (h) that comprises hash values (such as h(0), h(1), h(2), and so on) of all attribute fields (such as "Age", "Weight", "Blood Pressure" and so on), whose values (such as x(0), x(1), x(2), and so on) are included in a query data (x). The first device 102 may apply a hash function (H) on each attribute field values are included in the query data (x). Based on the application of the hash function (H) on each attribute field (such as "Age"), a hash value (such as h(0)), a hash value of the corresponding attribute field (i.e., "Age") may be obtained.

Once the first device 102 receives the seed from the third device 106 and the second device 104 receives the second share of the decision tree from the third device 106, both the first device 102 and the second device 104 iteratively execute a set of steps for traversing the decision tree until a leaf node is encountered. The first device 102 constructs a path from a root node to the leaf node of the first share of the decision tree (not received or stored in the first device 102) using the seed and traverses through the path during the iterative execution of the set of steps. The execution of the set of steps at each iteration leads to a selection of a non-leaf node at a certain depth level and a traversal from the non-leaf node to another non-leaf node or a leaf node at another depth level. Thus, the execution of the set of steps at each iteration leads to an incremental creation of the path. On the other hand, the second device 104 incrementally traverses through a corresponding path from a root node to a corresponding leaf node of the second share of the decision tree (stored in the second device 104) during each iteration of execution of the set of steps.

Each iterative execution of the set of steps involves a selection of a non-leaf node of the first share of the decision tree and a selection of a corresponding non-leaf node of the second share of the decision tree. For instance, at a first iteration of the set of steps, a root node of the first share of the decision tree and a (corresponding) root node of the second share of the decision tree may be selected.

At each iteration, the first device 102 permutes each of the query data (x) and the hash vector (h) randomly to generate a permuted query data (x') and a permuted hash vector (h'). For instance, x=[x(0), x(1), x(2)] and h=[h(0), h(1), h(2)], where x(0) is a value of an attribute field "Age", h(0) is a hash value of the attribute field "Age", x(1) is a value of an attribute field "Weight", h(1) is a hash value of the attribute field "Weight", where x(2) is a value of an attribute field "Blood Pressure", and h(2) is a hash value of an attribute field "Blood Pressure". An exemplary permuted query data (x')=[x(2), x(0), x(1)] and an exemplary hash vector (h)=[h(2), h(0), h(1)]. A sequence of values of the attribute fields and a sequence of hash values of the attribute fields are altered during the permutation, leading to the generation of the permuted query data (x') and the permuted hash vector (h'). It may be noted that the permutation of each of the query data (x) and the hash vector (h) are identical at each iteration.

Thereafter, the first device 102 transmits a masked version of the permuted hash vector and masked versions of a first share of a hash value of an attribute field (such as "Age") associated with the (selected) non-leaf node of the first share of the decision tree to the second device 104. Based on the masked version of the permuted hash vector and the masked versions of the first share of the hash value of the attribute field, the second device 104 generates a first share of an attribute-targeting vector $[\delta]_0$ associated with the (selected) non-leaf node. The first device 102 further receives the first share of an attribute-targeting vector $[\delta]_0$ from the second device 104. The generation of the first share of the attribute-targeting vector $[\delta]_0$ by the second device 104, is discussed in detail in FIG. 3.

Thereafter, the first device 102 generates a first share of the permuted query data $[x']_0$ and a second share of the permuted query data $[x']_1$. The generation is based on an application of an additive secret sharing function on the permuted query data (x'). The first device 102 stores the first share of the permuted query data $[x']_0$ and transmits the second share of the permuted query data $[x']_1$ to the second device 104.

Thereafter, the first device 102 computes a first share of a dot product of an attribute-targeting vector (δ) and the permuted query data (x') based on the first share of the attribute-targeting vector $[\delta]_0$ associated with the non-leaf node and the first share of the permuted query data $[x']_0$. Meanwhile, the second device 104 computes a second share of the dot product based on a second share of the attribute-targeting vector $[\delta]_1$ associated with the (selected) corresponding non-leaf node of the second share of the decision tree and the second share of the permuted query data $[x']_1$. The generation of the second share of the attribute-targeting vector $[\delta]_1$ by the second device 104, is discussed in detail in FIG. 3.

The second device 104, thereafter, performs a secure comparison operation. Prior to the performance of the secure comparison operation, the first device 102 may mask each of a first share of a threshold associated with the (selected) non-leaf node of the first share of the decision tree and the first share of the dot product of the attribute-targeting vector ($\delta$) and the permuted query data (x'). Thereafter, the first device 102 may transmit, to the second device 104, masked versions of each of the first share of the threshold associated with the (selected) non-leaf node and the first share of a dot product of the attribute-targeting vector ($\delta$) and the permuted query data (x'). The secure comparison operation is performed based on masked versions of each of the first share of the dot product (received from the first device 102), a first share of a threshold associated with the (selected) non-leaf node (received from the first device 102), the second share of the dot product, and a second share of the threshold associated with the (selected) corresponding non-leaf node. The performance of the secure comparison operation by the second device 104 corresponds to the outsourcing of inference of the decision tree by the first device 102.

The second device 106 further transmits an outcome of the secure comparison operation to the first device 102. Based on the outcome, the first device 102 selects a first child node of the (selected) non-leaf node and the second device 104 selects a second child node of the (selected) corresponding non-leaf node. The selections correspond to traversals of through the first share of the decision tree and the second share of the decision tree. At a subsequent iteration, the first child node becomes the (selected) non-leaf node of the first share of the decision tree and the second child node becomes the (selected) corresponding non-leaf node of the second share of the decision tree. At the final iteration, however, the first child node is a first leaf node of the first share of the decision tree and the second child node is a corresponding second leaf node of the second share of the permuted decision tree.

When the first leaf node and the corresponding second leaf node are selected after a predefined number of iterations of execution of the set of steps, classification results may be obtained. The predefined number is based on a depth of the decision tree (i.e., the first share of the decision tree and the second share of the decision tree). The first device 102 determines a first share of the classification result based on a label associated with the first leaf node and the second device 104 determines a second share of the classification result based on a label associated with the corresponding second leaf node. The second device 104 further transmits the second share of the classification result to the first device 102. Based on the first share of the classification result and the second share of the classification result, the first device 102 generates a decision tree classification result.

A discussion of a second embodiment of the two embodiments follows.

Second Embodiment

As mentioned previously, the third device 106, i.e., the model owner, owns a decision tree classification model, i.e., a decision tree. Each non-leaf node of the decision tree is associated with an attribute, a threshold, and an attribute targeting vector. Each leaf node of the decision tree is associated with a label. For obfuscating attributes associated with non-leaf nodes of the decision tree, the third device 106 permutes the decision tree. Permutation of the decision tree prevents attribute leakage once shares of the permuted decision tree classification model are distributed to the first device 102 and the second device 104. To generate the permuted decision tree classification model, the third device 106 defines ($v_b$), which is a matrix indicative of a sequence of attributes, and a permutation matrix (A). Based on a product of (A) and ($v_b$), a matrix indicative of the attribute sequence vector (V) is generated. The attribute sequence vector, i.e., (V), is a permuted sequence of attributes. Based on (V), the third device 106 is configured to permute the decision tree, leading to generation of a permuted decision tree. The permutation changes depth levels of non-leaf nodes of the original decision tree in accordance with (V). The permutation leads to obfuscation of the attributes, as the attributes associated with the non-leaf nodes are updated after the permutation.

Thereafter, the third device 106 splits the permuted decision tree to generate a first share of the permuted decision tree $[M']_0$ and a second share of the permuted decision tree $[M']_1$. The splitting causes both thresholds and elements of attribute targeting vectors associated with each non-leaf node of the permuted decision tree classification model to be split. For instance, a sum of a first share of a threshold $[t]_0$ associated with a non-leaf node in the first share of the permuted decision tree and a second share of the threshold $[t]_0$ associated with a corresponding non-leaf node in the second share of the permuted decision tree is equal to a threshold of a non-leaf node of the permuted decision tree. Furthermore, a sum of an element in a first share of an attribute targeting vector $[\delta]_0$ associated with a non-leaf node in the first share of the permuted decision tree and a corresponding element in a second share of the attribute targeting vector $[\delta]_1$ associated with a corresponding non-leaf node in the second share of the permuted decision tree is equal to an element in an attribute targeting vector ($\delta$) of a non-leaf node of the permuted decision tree. The splitting the permuted decision tree also causes labels associated with leaf nodes of the permuted decision tree to be split. Thus, a sum of a first share of a label $[c]_0$ associated with a leaf node in the first share of the permuted decision tree and a second share of the label $[c]_1$ associated with a corresponding leaf node in the second share of the permuted decision tree is equal to a label of a leaf node of the permuted decision tree.

The third device 106 transmits the attribute sequence vector, i.e., (V), to the first device 102. The first device 102 receives the attribute sequence vector (i.e., the permuted sequence of attributes), and, based on (V) (x), permutes an original query data (x). The original query data (x) includes the sequence of attribute values that corresponds to the sequence of attributes ($v_b$). The permutation results in altering of the sequence of attribute values based on (V) and, consequently, obtaining of the permuted query data (x'). The alteration involves relocating attribute values in the original query data in accordance with (V), resulting in transformation from (x) to (x').

The first device 102 applies an additive secret sharing on the permuted query data (x'), leading to a splitting of the permuted query data into a first share of the permuted query data $[x']_0$ and a second share of the permuted query data $[x']_1$. To reduce transmission cost (i.e., communication overhead) involved in sending the second share of the permuted query data $[x']_1$ to the second device 104, the first device 102 transmits a first seed to the second device 104. Based on the first seed, the second device 104 constructs the second share of the permuted query data $[x']_1$ at its end. Thus, a transmission cost involved in sending the second share $[x']_1$ of the permuted query data is significantly reduced.

The third device 106 transmits a second seed and a first share of an attribute targeting vector $[\delta]_0$ associated with each non-leaf node of the first share of the permuted decision tree to the first device 102. The second seed enables the first device 102 to compute first shares of thresholds associated with a set of non-leaf nodes of the first share of the permuted decision tree and a first share of a label associated with a leaf node (from which a share of a classification result is obtained) of the first share of the permuted decision tree. The set of non-leaf nodes include those non-leaf nodes in the first share of the permuted decision tree $[M']_0$ which form a path from a root node to a leaf node of the first share of the permuted decision tree. A traversal through the path based on outcomes of multiple secure comparison operations leads to a first share of a classification result. The set of non-leaf nodes initially includes only the root node. The set of non-leaf nodes is expanded after each secure comparison operation to include a non-leaf node that has been traversed.

The transmission of the second seed by the third device 106 may allow reducing communication overhead, which might otherwise be involved in transmitting the first shares of the thresholds and the first shares of the labels to the first device 102. The first device 102 further masks the first shares of the thresholds associated with the set of non-leaf nodes of the first share of the permuted decision tree $[M']_0$ using a first share of a mask variable. Thereafter, the first device 102 transmits masked versions of the first shares of the thresholds associated with the set of non-leaf nodes to the second device 104.

The third device 106 further transmits the second share of the permuted decision tree $[M']_1$ to the second device 104. The transmission may include second shares of the thresholds associated with all corresponding non-leaf nodes of the second share of the permuted decision tree $[M']_1$, a second share of the attribute targeting vector $[\delta]_1$ associated with each corresponding non-leaf node of the second share of the permuted decision tree, and second shares of labels associated with all corresponding leaf nodes of the second share of the permuted decision tree. The second share of the permuted decision tree $[M']_1$ includes a set of corresponding non-leaf nodes and a corresponding leaf node. The set of corresponding non-leaf nodes include those corresponding non-leaf nodes in the second share of the permuted decision tree $[M']_1$ which form a corresponding path from a corresponding root node to the corresponding leaf node of the second share of the permuted decision tree $[M']_1$. A traversal through the corresponding path based on outcomes of multiple secure comparison operations leads to a second share of the classification result. The set of corresponding non-leaf nodes initially includes only the corresponding root node. The set of corresponding non-leaf nodes is expanded after each secure comparison operation to include a corresponding non-leaf node that has been traversed.

The second device 102 further masks the second shares of the thresholds associated with the set of corresponding non-leaf nodes of the second share of the permuted decision tree $[M']_1$.

The first device 102 further computes first shares of dot products associated with the set of non-leaf nodes of the first share of the permuted decision tree $[M']_0$ based on first shares of attribute-targeting vectors associated with the set of non-leaf nodes and the first share of the permuted query data $[x']_0$. For a non-leaf node of the set of non-leaf nodes, a first share of a dot product is computed based on a first share of an attribute-targeting vector $[\delta]_0$ associated with the non-leaf node and the first share of the permuted query data $[x']_0$. The first device 102 further masks the first shares of the dot products associated with the set of non-leaf nodes of the first share of the permuted decision tree $[M']_0$. Thereafter, the first device 102 transmits masked versions of the first shares of the dot products associated with the set of non-leaf nodes to the second device 104.

The second device 104 computes second shares of the dot products associated with a set of corresponding non-leaf nodes of the second share of the permuted decision tree $[M']_1$ based on second shares of the attribute-targeting vectors associated with the set of corresponding non-leaf nodes and the second share of the permuted query data $[x']_1$. For a corresponding non-leaf node of the set of corresponding non-leaf nodes, a second share of the dot product is computed based on a second share of an attribute-targeting vector $[\delta]_1$ associated with the corresponding non-leaf node and the second share of the permuted query data $[x']_1$. The second device 102 further masks the second shares of the attribute-targeting vectors associated with the set of corresponding non-leaf nodes of the second share of the permuted decision tree $[M']_1$.

The second device 106 performs a number of secure comparison operations based on masked versions of each of the first shares of the thresholds associated with the set of non-leaf nodes of the first share of the permuted decision tree $[M']_0$, the first shares of the dot products associated with the set of non-leaf nodes of the first share of the permuted decision tree $[M']_0$, the second shares of the thresholds associated with the set of corresponding non-leaf nodes of the second share of the permuted decision tree $[M']_1$, and the second shares of the dot products associated with the set of corresponding non-leaf nodes of the second share of the permuted decision tree $[M']_1$. Based on the outcomes of the secure comparison operations, the second device 106 determines a second share of the classification result.

It is to be noted that the secure comparison may be performed a predefined number of times that is equal to a depth level of leaf nodes of the permuted decision tree. (It may be noted that the depth level at root node is zero). Each outcome of the secure comparison operations allows traversing from a first corresponding non-leaf node at a certain depth level to a second corresponding non-leaf node or a corresponding leaf node at a next higher depth level within the second share of the permuted decision tree. After traversing the first corresponding non-leaf node, the set of corresponding non-leaf nodes (which initially includes the corresponding root node) is expanded to include the first corresponding non-leaf node.

The second share of the classification result is obtained as outcome of a final secure comparison operation and involves reaching a leaf node of the second share of the permuted decision tree. The second device 104 further transmits outcomes of (all of the predefined number of) secure comparison operations to the first device 102. The second device 104 also transmits the second share of the classification result to the first device 102. The performance of the predefined number of secure comparison operations by the second device 104 is due to outsourcing of decision tree inference by the first device 102 to the second device 104.

The first device 102 determines a first share of the classification result based on outcomes of the secure comparison operations. Based on the outcomes of the secure comparison operations, the first device 102 traverses the first share of the permuted decision tree. Each outcome of the secure comparison operations allows traversing from a first non-leaf node at a certain depth level to a second non-leaf node or a leaf node at a next higher depth level within the first share of the permuted decision tree. After traversing from the first non-leaf node, the set of non-leaf nodes (which initially includes the root node) is expanded to include the first non-leaf node. The first share of the classification result is obtained as the outcome of the final secure comparison operation and involves reaching a leaf node of the first share of the permuted decision tree. Based on the first share of the classification result and the second share of the classification result, the first device 102 generates a decision tree classification result.

FIG. 1 merely depicts an exemplary networking environment 100, which should not unduly limit the scope of the disclosure. Persons skilled in the art can recognize many variations, alternatives, and modifications of embodiments of the present disclosure.

Figure 2:
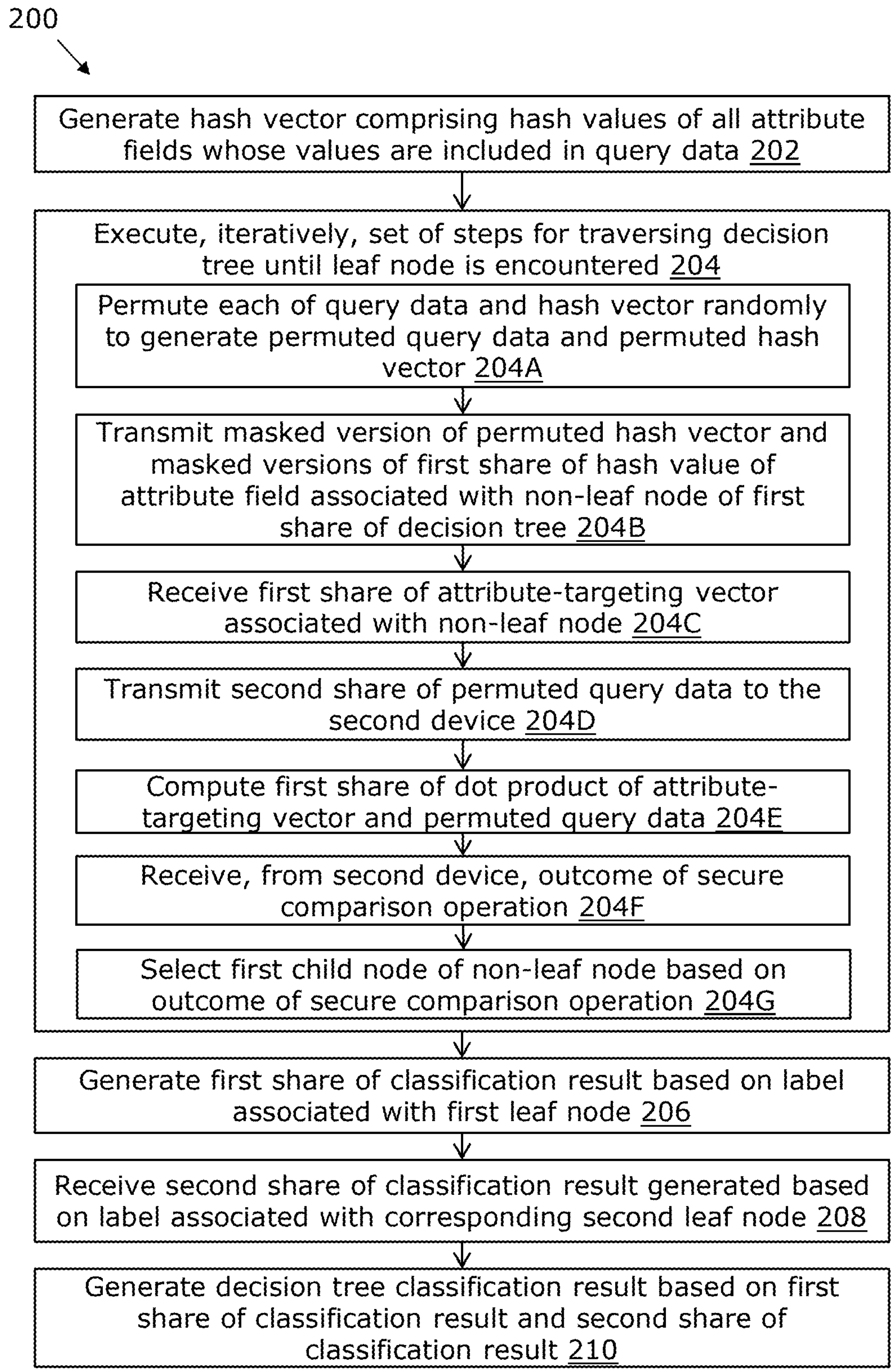
FIG. 2 is a flowchart that illustrates steps of a method for outsourcing decision tree inference while obfuscating decision tree attributes during the inference, in accordance with a first embodiment of the present disclosure.

FIG. 2 is a flowchart 200 that illustrates steps of a method for outsourcing decision tree inference while involving decision tree attribute obfuscation, in accordance with the first embodiment of the present disclosure. FIG. 2 is described in conjunction with elements from FIG. 1.

With reference to FIG. 2, there is shown the flowchart 200. The flowchart 200 includes steps 202-210. The first device 102 is configured to execute the method for outsourcing inference of a decision tree whose attributes are obfuscated during the inference. At step 202, the method includes generating, by use of the first device 102, a hash vector comprising hash values of all attribute fields whose values are included in a query data. At step 204, the method includes iteratively executing, by use of the first device 102, a set of steps 204A-204G for traversing the decision tree until a leaf node is encountered.

At step 204A, the method includes permuting, by use of the first device 102, each of the query data and the hash vector randomly to generate a permuted query data and a permuted hash vector. At step 204B, the method includes transmitting, by use of the first device 102, a masked version of the permuted hash vector and masked versions of a first share of a hash value of an attribute field associated with a (selected) non-leaf node of the first share of the decision tree to the second device 104. At step 204C, the method includes receiving, by use of the first device 102, a first share of an attribute-targeting vector associated with the non-leaf node from the second device 104. The generation of the first share of the attribute-targeting vector associated with the non-leaf node is based on the masked version of the permuted hash vector and the masked versions of the first share of the hash value of the attribute field. At step 204D, the method includes transmitting, by use of the first device 102, a second share of the permuted query data to the second device 104. A first share of the permuted query data and the second share of the permuted query data are generated based on an application of an additive secret sharing function on the permuted query data.

At step 204E, the method includes computing, by use of the first device 102, a first share of a dot product of an attribute-targeting vector and the permuted query data based on the first share of the attribute-targeting vector associated with the non-leaf node and the first share of the permuted query data. The second device 104, meanwhile, computes a second share of the dot product. The computation is based on a second share of the attribute-targeting vector that is associated with a (selected) corresponding non-leaf node of a second share of the decision tree and the second share of the permuted query data. At step 204F, the method includes receiving, by the first device 102 from the second device 104, an outcome of a secure comparison operation. The secure comparison operation is performed based on masked versions of each of the first share of the dot product, a first share of a threshold associated with the non-leaf node, the second share of the dot product, and a second share of the threshold associated with the corresponding non-leaf node. At a first iteration, the (selected) non-leaf node is a root node of the first share of the decision tree and the (selected) corresponding non-leaf node is a root node of the second share of the decision tree. At step 204G, the method includes selecting, by use of the first device 102, a first child node of the (selected) non-leaf node based on the outcome of the secure comparison operation. Furthermore, a second child node of the (selected) corresponding non-leaf node is selected by the second device 104 based on the outcome of the secure comparison operation. At a subsequent iteration, the first child node is the non-leaf node of the first share of the decision tree and the second child node is the corresponding non-leaf node of the second share of the decision tree. The first child node is a first leaf node of the first share of the decision tree selected at a final iteration. The second child node is a corresponding second leaf node of the second share of the decision tree selected at the final iteration.

At step 206, the method includes generating, by use of the first device 102, a first share of a classification result based on a label associated with the first leaf node. At step 208, the method includes receiving, by the first device 102, a second share of the classification result from the second device 104. The second share of the classification result is generated based on a label associated with the corresponding second leaf node stored in the corresponding second leaf node. At step 210, the method includes generating, by use of the first device 102, a decision tree classification result based on the first share of the classification result and the second share of the classification result.

The steps 202-210 are illustrative, and other alternatives can also be provided where one or more steps are added, one or more steps are provided in a different sequence, or one or more steps are eliminated, without departing from the scope of the claims herein.

There is provided a computer program comprising instructions for carrying out all the steps of the method. The computer program is executed on the first device 102 in conjunction with the second device 104 and the third device 106. The computer program is implemented as an algorithm, embedded in a software stored in the non-transitory computer-readable storage medium that has program instructions stored thereon, the program instructions being executable by the one or more processors in the computer system to execute the method illustrated using the flowchart 200. The non-transitory computer-readable storage means may include, but are not limited to, an electronic storage device, a magnetic storage device, an optical storage device, an electromagnetic storage device, a semiconductor storage device, or any suitable combination of the foregoing. Examples of implementation of computer-readable storage medium, but are not limited to, an Electrically Erasable Programmable Read-Only Memory (EEPROM), a Random Access Memory (RAM), a Read Only Memory (ROM), a Hard Disk Drive (HDD), a Flash memory, a Secure Digital (SD) card, a Solid-State Drive (SSD), a computer-readable storage medium, and/or a CPU cache memory.

Figure 3:
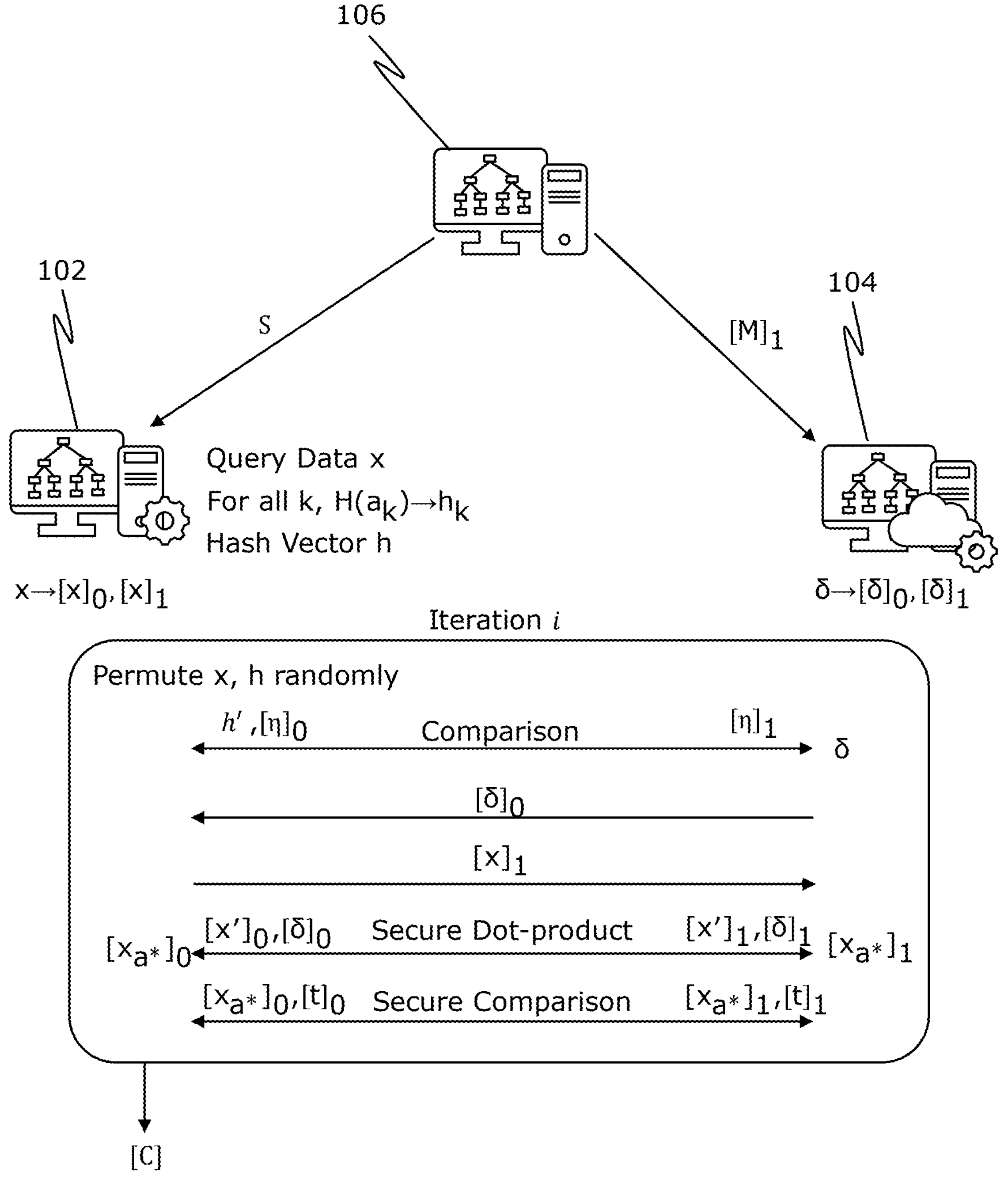
FIG. 3 illustrates an information exchange between entities of the networking environment for outsourcing inferencing of a decision tree classification model and obfuscating attributes of the decision tree classification model during inference, in accordance with the first embodiment of the present disclosure.

FIG. 3 illustrates an information exchange between entities of the networking environment 100 for outsourcing inferencing of a decision tree classification model and obfuscating attributes of the decision tree classification model during inference, in accordance with the first embodiment of the present disclosure. FIG. 3 is described in conjunction with elements from FIG. 1 and FIG. 2. With reference to FIG. 3, there is shown the information exchange between the first device 102, the second device 104, and the third device 106 (the entities of the networking environment 100). The third device 106 owns a decision tree classification model, i.e., a decision tree (M) that is to be inferenced. Each non-leaf node of the decision tree (M) is associated with an attribute field, a hash value of the attribute field (η), and a threshold (t). Additionally, each leaf node of the decision tree (M) is associated with a label.

The third device 106 may split the decision tree (M) based on additive secret sharing to generate shares of the decision tree. The shares include a first share of the decision tree $[M]_0$ and a second share of the decision tree $[M]_1$. The splitting of the decision tree (M) results in splitting of a hash value of an attribute field (η) and a threshold (t) associated with each non-leaf node of the decision tree (M). Thus, an accumulation of a first share of a hash value of an attribute field $[\eta]_0$ associated with a non-leaf node of $[M]_0$ and a second share of the hash value of the attribute field $[\eta]_1$ associated with a corresponding non-leaf node of $[M]_1$ is equal to a hash value of the attribute field (η) associated with a non-leaf node of (M). Furthermore, an accumulation of a first share of a threshold $[t]_0$ associated with the non-leaf node of $[M]_0$ and a second share of the threshold $[t]_1$ associated with the corresponding non-leaf node of $[M]_1$ is equal to a threshold (t) associated with the non-leaf node of (M). The splitting is also applicable to a label associated with each leaf node of (M). Thus, an accumulation of a first share of a label $[c]_0$ associated with a leaf node of $[M]_0$ and a second share of the label $[c]_1$ associated with a corresponding leaf node of $[M]_1$ is equal to a label associated with a leaf node of (M).

The third device 106 does not transmit the first share of the decision tree $[M']_0$ to the first device 102. Instead, the third device 106 transmits a seed (s) to the first device 102. The seed (s) may allow the first device 102 to use a pseudo random generator (PRNG) function to determine first shares of hash values of attribute fields and first shares of thresholds associated with non-leaf nodes of the first share of the decision tree $[M]_0$ and first shares of labels associated with leaf nodes of the first share of the decision tree $[M]_0$. This reduces transmission overhead and allows preserving (limited) memory of the first device 102. The third device 106 transmits the second share of the decision tree $[M]_1$ to the second device 104. The transmission includes second shares of the hash values of the attribute fields and second shares of the thresholds associated with the corresponding non-leaf nodes of the second share of the decision tree $[M]_1$, and second shares of the labels associated with the corresponding leaf nodes of the second share of the decision tree $[M]_1$.

The first device 102 outsources generates a hash vector (h) that comprises hash values of all attribute fields whose values are included in a query data (x). For example, the query data may constitute a sequence [x(0), x(1), x(2)], wherein x(0) is a value of a first attribute field, x(1) is a value of a second attribute field, and x(2) is a value of a third attribute field. The first device 102 may apply a hash function (H) on each attribute field whose value is included in the query data. For example, the first attribute field may be "Age", the second attribute field may be "Weight", and the third attribute field may be "Blood Pressure". Thus, the hash function (H) is applied on each of "Age", "Weight", and "Blood Pressure". Based on the application of the hash function on each attribute field, a hash value of each attribute field is obtained. For instance, hash values h(0)=H(Age), h(1)=H(Weight), and h(2)=H(Blood Pressure) may be obtained. Thus, an exemplary hash vector (h)=[h(0), h(1), h(2)], which constitutes a sequence of hash values of all attribute fields is obtained.

Thereafter, both the first device 102 and the second device 104 iteratively execute a set of steps to traverse $[M]_0$ and $[M]_1$, respectively. Multiple iterations of execution of the set of steps are carried out for obtaining a classification result [c]. The iterations may continue until a leaf node in $[M]_0$ and a corresponding leaf node in $[M]_1$ is reached, i.e., the classification result [c] is obtained. A specific number of iterations of execution of the set of steps that are required to be carried out for obtaining a classification result [c] depends on a depth level of $[M]_0$ and $[M]_1$. Specifically, if the depth level is "n", where depth level at respective root nodes of $[M]_0$ and $[M]_1$ is "0" and the depth level at respective leaf nodes of $[M]_0$ and $[M]_1$ is "n", then there would be "n" iterations required to obtain the for obtaining a classification result [c]. In other words, the set of steps will be executed "n" times. For example, of the depth level of $[M]_0$ and $[M]_1$ is "3", the set of steps will be required to be executed three times (in three iterations) to arrive at the classification result.

At each iteration, the first device 102 permutes each of the query data (x) and the hash vector (h) randomly. The permutation of the query data (x) leads to generation of a permuted query data (x'). On the other hand, the permutation of the hash vector (h) leads to generation of a permuted hash vector (h'). For the generation of the permuted query data (x'), the first device 102 randomly alters (i.e., permutes) a sequence of values of attribute fields (such as [x(0), x(1), x(2)]) constituting the query data (x). For example, random altering of a sequence of the values of attribute fields results in a permuted query data (x')=[x(2), x(0), x(1)]. Furthermore, for the generation of the permuted hash vector (h'), the first device 102 randomly alters (i.e., permutes) a sequence of hash values of all attribute fields (such as [h(0), h(1), h(2)] constituting the hash vector (h). For example, random altering of a sequence of hash values of all attribute fields results in a permuted hash vector (h')=[h(2), h(0), h(1)]. It may be noted that the permutation of each of the query data (x) and the hash vector (h) are identical at each iteration.

Each iterative execution of the set of steps involves a selection of a non-leaf node of the first share of the decision tree $[M]_0$ and a selection of a corresponding non-leaf node of the second share of the decision tree $[M]_1$ based on an outcome of a secure comparison operation (described later) at a previous iteration. However, at a first iteration of execution of the set of steps, the first device 102 selects a root node of the first share of the decision tree $[M]_0$ by default and the second device 104 selects a (corresponding) root node of the second share of the decision tree $[M]_1$ by default. After the selection, the first device 102 generates a masked version of the permuted hash vector (h') and masked versions of a first share of a hash value of an attribute field $[\eta]_0$ associated with a (selected) non-leaf node of the first share of the decision tree $[M]_0$. The masked version of the permuted hash vector is generated by masking each element of the permuted hash vector (h') by a unique mask variable. Thus, if the permuted hash vector (h') is [h(2), h(0), h(1)], then a first masked version of the permuted hash vector (h') is $[h(2)+I_1, h(0)+I_2, h(1)+I_3]$. The elements h(2), h(0), and h(1) may be masked by mask variables $I_1$, $I_2$, and $I_3$, respectively. Each masked version of the first share of the hash value of the attribute field $[\eta]_0$ associated with the (selected) non-leaf node is also generated using the unique mask variable. The masked versions of the first share of the hash value of the attribute field $[\eta]_0$ are $[\eta]_0+I_1$, $[\eta]_0+I_2$, and $[\eta]_0+I_3$.

Thereafter, the first device 102 transmits the masked version of the permuted hash vector and the masked versions of the first share of the hash value of the attribute field associated with the (selected) non-leaf node of the first share of the decision tree $[M]_0$ to the second device 104. Upon reception of the masked version of the permuted hash vector and the masked versions of the first share of the hash value of the attribute field associated with the (selected) non-leaf node of the first share of the decision tree $[M]_0$, the second device 104 generates an attribute-targeting vector (δ).

A number of elements included in the attribute-targeting vector (δ) is identical to that included in the permuted hash vector (h'). For instance, if permuted hash vector (h') includes three elements, then the attribute-targeting vector (δ) will also include three elements. A first element of (δ), i.e., δ(0), is determined by comparing an element $\{h(2)+I_1\}$ of the masked version of the permuted hash vector (h') with an accumulation of a masked version of the first share of the hash value of the attribute field $[\eta]_0+I_1$ associated with the (selected) non-leaf node and a second share of the hash value of the attribute field $[\eta]_1$ associated with the (selected) corresponding non-leaf node of the second share of the decision tree $[M]_1$. In other words, the second device 104 compares $\{h(2)+I_1\}$ with $\{[\eta]_0+[\eta]_1+I_1\}$. If $\{h(2)+I_1\}$ is equal to $\{[\eta]_0+[\eta]_1+I_1\}$, then δ(0) is "1". Otherwise, δ(0) is "0". Similarly, a second element of (δ), i.e., δ(1), is determined based on a comparison between $\{h(0)+I_2\}$ and $\{[\eta]_0+[\eta]_1+I_2\}$ and a third element of (δ), i.e., δ(2), is determined based on a comparison between $\{h(1)+I_3\}$ and $\{[\eta]_0+[\eta]_1+I_3\}$. Out of the three elements, one element will be "1" while the other two will be zero. The possibility of an element having a value "1" depends on the attribute field to which the (selected) non-leaf node and the (selected) corresponding non-leaf node are associated.

If the (selected) non-leaf node and the (selected) corresponding non-leaf node are associated with the attribute field "Age", then δ(1) is "1". This is because $\{[\eta]_0+[\eta]_1+I_2\}$=H(Age)$+I_2$ and $h(0)+I_2$=H(Age)$+I_2$. Herein, "H(Age)" is the hash value of the attribute field "Age". Also, "H(Age)" is equal to an accumulation of a first share of a hash value of the attribute field $[\eta]_0$ associated with the (selected) non-leaf node of $[M]_0$ and a second share of the hash value of the attribute field $[\eta]_1$ associated with the (selected) corresponding non-leaf node of $[M]_1$, i.e., $[\eta]_0+[\eta]_1$. Thus, the attribute-targeting vector (δ) is [0, 1, 0].

Similarly, if the (selected) non-leaf node and the (selected) corresponding non-leaf node are associated with the attribute field "Weight", then δ(2) is "1" and the attribute-targeting vector (δ) is [0, 0, 1]. This is because $\{[\eta]_0+[\eta]_1+I_3\}$=H(Weight)$+I_3$ and $h(1)+I_3$=H(Weight)$+I_3$. Furthermore, if the (selected) non-leaf node and the (selected) corresponding non-leaf node are associated with the attribute field "Blood Pressure", then δ(0) is "1" and the attribute-targeting vector (δ) is [1, 0, 0]. This is because $\{[\eta]_0+[\eta]_1+I_1\}$=H(Blood Pressure)$+I_1$ and $h(2)+I_1$=H(Blood Pressure)$+I_1$. It is observed that the attribute-targeting vector (δ), generated at a certain iteration, is indicative of a position in the query data (x) (i.e., a sequence) where a value of the attribute field (such as "Age") is situated. The (selected) non-leaf node and the (selected) corresponding non-leaf node are associated with the attribute field.

Upon generation of the attribute-targeting vector (δ), the second device 104 applies an additive secret sharing function on the attribute-targeting vector (δ). The application results in generation of a first share of the attribute-targeting vector $[\delta]_0$ associated with the (selected) non-leaf node and the second share of the attribute-targeting vector $[\delta]_1$ associated with the (selected) corresponding non-leaf node. An accumulation of the first share of the attribute-targeting vector associated with the non-leaf node and the second share of the attribute-targeting vector associated with the corresponding non-leaf node, i.e., $[\delta]_0+[\delta]_1$ results in the attribute-targeting vector (δ). Thereafter, the second device 104 transmits the first share of the attribute-targeting vector $[\delta]_1$ to the first device 104.

At each iteration, the first device 102 generates a first share of the permuted query data $[x']_0$ and a second share of the permuted query data $[x']_1$. The first device 102 applies an additive secret sharing function on the permuted query data (x'), leading to the generation of the first share of the permuted query data $[x']_0$ and the second share of the permuted query data $[x']_1$ as outputs. An accumulation of the first share of the permuted query data $[x']_0$ and the second share of the permuted query data $[x']_1$ results in the permuted query data (x'). Specifically, an accumulation of an element of the first share of the permuted query data and a corresponding element of the second share of the permuted query data results in an element of the permuted query data. Based on the exemplary permuted query data (x')=[x(2), x(0), x(1)], the first share of the permuted query data $[x']_0$ is $[[x(2)]_0, [x(0)]_0, [x(1)]_0]$ and the second share of the permuted query data $[x']_1$ is $[[x(2)]_1, [x(0)]_1, [x(1)]_1]$. Thus, $[x(2)]_0+[x(2)]_1$ is x(2). Similarly, $[x(0)]_0+[x(0)]_1$ is x(0) and $[x(1)]_0+[x(1)]_1$ is x(1).

The first device 102 stores the first share of the permuted query data $[x']_0$ and transmits the second share of the permuted query data $[x']_1$ to the second device 104. In some embodiments, the first device 102 a query seed ($s_q$) to the second device 104 instead of sending the second share of the permuted query data $[x']_1$. This allows reducing the communication overhead significantly. The second device uses the query seed ($s_q$) and the PRNG function to generate the second share of the permuted query data $[x']_1$ at its end. For instance, $[x(2)]_1$ is PRNG($s_q$), $[x(0)]_1$ is PRNG(PRNG($s_q$)), and $[x(1)]_1$ is PRNG(PRNG(PRNG($s_q$))).

Thereafter, the first device 102 computes a first share of a dot product of the attribute-targeting vector (δ) and the permuted query data (x'). The first share of the dot product $[x_{a*}]_0$ is computed based on the first share of the attribute-targeting vector $[\delta]_0$ associated with the (selected) non-leaf node and the first share of the permuted query data $[x']_0$. The second device 104 computes a second share of the dot product $[x_{a*}]_1$ based on the second share of the attribute-targeting vector $[\delta]_1$ associated with the (selected) corresponding non-leaf node of the second share of the decision tree and the second share of the permuted query data $[x']_1$. The computation of the dot product of the attribute-targeting vector (δ) and the permuted query data (x') securely between the first device 102 and the second device 104 allows obfuscating the attribute field access pattern and information associated with the (selected) non-leaf node and the (selected) corresponding non-leaf node.

In accordance with an embodiment, shares of three beaver tiples are used for secure dot product computation between the first device 102 and the second device 104. The first device 102 possesses a first share of a first beaver triple $[p]_0$, a first share of a second beaver triple $[q]_0$, and a first share of a third beaver triple $[r]_0$. On the other hand, the second device 104 possesses a second share of the first beaver triple $[p]_1$, a second share of the second beaver triple $[q]_1$, and a second share of the third beaver triple $[r]_1$. The first share of the third beaver triple $[r]_0$ is generated based on the first share of the first beaver triple $[p]_0$, the second share of the second beaver triple $[q]_1$, and a constant (T). The second share of the third beaver triple $[r]_1$ is generated based on the second share of the first beaver triple $[p]_1$, the first share of the second beaver triple $[q]_0$, and the constant (T).

The first device 102 masks the first share of the attribute-targeting vector $[\delta]_0$ by use of the first share of the first beaver triple $[p]_0$ to generate a masked version of the first share of the attribute-targeting vector. Furthermore, the first device 102 masks the first share of the permuted query data $[x']_0$ by use of the first share of the second beaver triple $[q]_0$ to generate a masked version of the first share of the permuted query data. Furthermore, the first device 102 transmits the masked version of the first share of the attribute-targeting vector and the masked version of the first share of the permuted query data to the second device 104. On the other hand, the second device 104 masks the second share of the attribute-targeting vector $[\delta]_1$ by use of the second share of the first beaver triple $[p]_0$ to generate a masked version of the second share of the attribute-targeting vector. Furthermore, the second device 104 masks the second share of the permuted query data $[x']_1$ by use of the second share of the second beaver triple $[q]_1$ to generate a masked version of the second share of the permuted query data. The second device 104 further transmits the masked version of the second share of the attribute-targeting vector, and a masked version of the second share of the permuted query data to the first device 102.

Upon receiving the masked version of the second share of the attribute-targeting vector, and the masked version of the second share of the permuted query data, the first device 102 computes the first share of the dot product $[x_{a*}]_0$. The computation is based on the first share of the attribute-targeting vector $[\delta]_0$, the first share of the permuted query data $[x']_0$, the masked version of the second share of the attribute-targeting vector, the masked version of the second share of the permuted query data, the first share of the second beaver triple $[q]_0$, and the first share of the third beaver triple $[r]_0$. Similarly, upon receiving the masked version of the first share of the attribute-targeting vector and the masked version of the first share of the permuted query data, the second device 104 computes the second share of the dot product $[x_{a*}]_1$ based on the second share of the attribute-targeting vector $[\delta]_1$, the second share of the permuted query data $[x']_1$, the masked version of the first share of the attribute-targeting vector, the masked version of the first share of the permuted query data, the second share of the second beaver triple $[q]_0$, and the second share of the third beaver triple $[r]_1$.

Thereafter, the second device 104 initiates a secure comparison operation. For the performance of the secure comparison operation, the second device 104 receives a masked version of the first share of the dot product and a masked version of a first share of a threshold associated with the (selected) non-leaf node of the first share of the decision tree $[M]_0$. The first device 102 may mask each of the first share of the dot product $[x_{a*}]_0$ and the first share of the threshold $[t]_0$ based on a first share of a mask variable to obtain the masked version of the first share of the dot product and the masked version of the first share of the threshold. Thereafter, the first device 102 transmits, to the second device 104, the masked version of the first share of the dot product and the masked version of the first share of the threshold associated with the (selected) non-leaf node. The transmissions of the masked versions of each of the first share of the dot product and the first share of the threshold associated with the (selected) non-leaf node corresponds for the performance of the secure comparison operation corresponds to an outsourcing of inference of the decision tree by the first device 102 to the second device 104.

At each iteration, the second device 104 performs the secure comparison operation based on the masked version of the first share of the dot product, the masked version of the first share of the threshold associated with the (selected) non-leaf node, a masked version of the second share of the dot product, and a masked version of a second share of the threshold associated with the (selected) corresponding non-leaf node of the second share of the decision tree $[M]_1$. The second device 104 may mask each of the second share of the dot product $[x_{a*}]_1$ and the second share of the threshold $[t]_0$ based on a second share of the mask variable to obtain the masked version of the second share of the dot product and the masked version of the second share of the threshold associated with the corresponding non-leaf node. At the first iteration, the (selected) non-leaf node is the root node of the first share of the decision tree $[M]_0$ and the (selected) corresponding non-leaf node is the root node of the second share of the decision tree $[M]_1$.

In accordance with an embodiment, the secure comparison operation is performed by comparing an accumulation of the masked version of the first share of the dot product and the masked version of the second share of the dot product with an accumulation of the masked version of the first share of the threshold associated with the (selected) non-leaf node and a masked version of the second share of the threshold associated with the (selected) corresponding non-leaf node.

After the performance of the secure comparison operation, the second device 104 transmits an outcome of the secure comparison operation to the first device 102. The first device 102 receives the outcome and, based on the outcome, selects a first child node of the (selected) non-leaf node of the first share of the decision tree $[M]_0$. The second device 104 selects a second child node of the (selected) corresponding non-leaf node of the second share of the decision tree $[M]_1$ based on the outcome. At a subsequent iteration (such as a second iteration), the first child node is (i.e., becomes) the non-leaf node of the first share of the decision tree of $[M]_0$ that is selected by the first device 102 and from where the traversal through $[M]_0$ is to be continued. The second child node is (i.e., becomes) the corresponding non-leaf node of the second share of the decision tree $[M]_1$ that is selected by the second device 104 and from where the traversal through $[M]_1$ is to be continued. However, at the final iteration, the outcome of the secure comparison operation leads to the selection of the first child node which is a first leaf node of the first share of the decision tree $[M]_0$. Furthermore, at the final iteration, the outcome of the secure comparison operation also leads to the selection of the second child node which is a corresponding second leaf node of the second share of the decision tree $[M]_1$.

After all iterations of execution of the set of steps are completed, the first device 102 generates a first share of a classification result $[c]_0$. The generation is based on a label associated with the first leaf node. Thus, after the reception of the outcome of the secure comparison at the final iteration, the first leaf node (i.e., the first child node) is selected and the label associated with the first leaf node is determined. Thereafter, $[c]_0$ is generated based on the label. Similarly, the second device 104 generates a second share of a classification result $[c]_1$ based on a label associated with the second leaf node. Thus, based on the outcome of the secure comparison at the final iteration, the corresponding second leaf node (i.e., the second child node) is selected and the label associated with the corresponding second leaf node is determined. Thereafter, $[c]_1$ is generated based on the label. Thereafter, the second device 104 transmits the second share of a classification result $[c]_1$ to the first device 102. The first device 102 generates a decision tree classification result [c] based on the first share of the classification result $[c]_0$ and the second share of the classification result $[c]_1$.

Figure 4A:
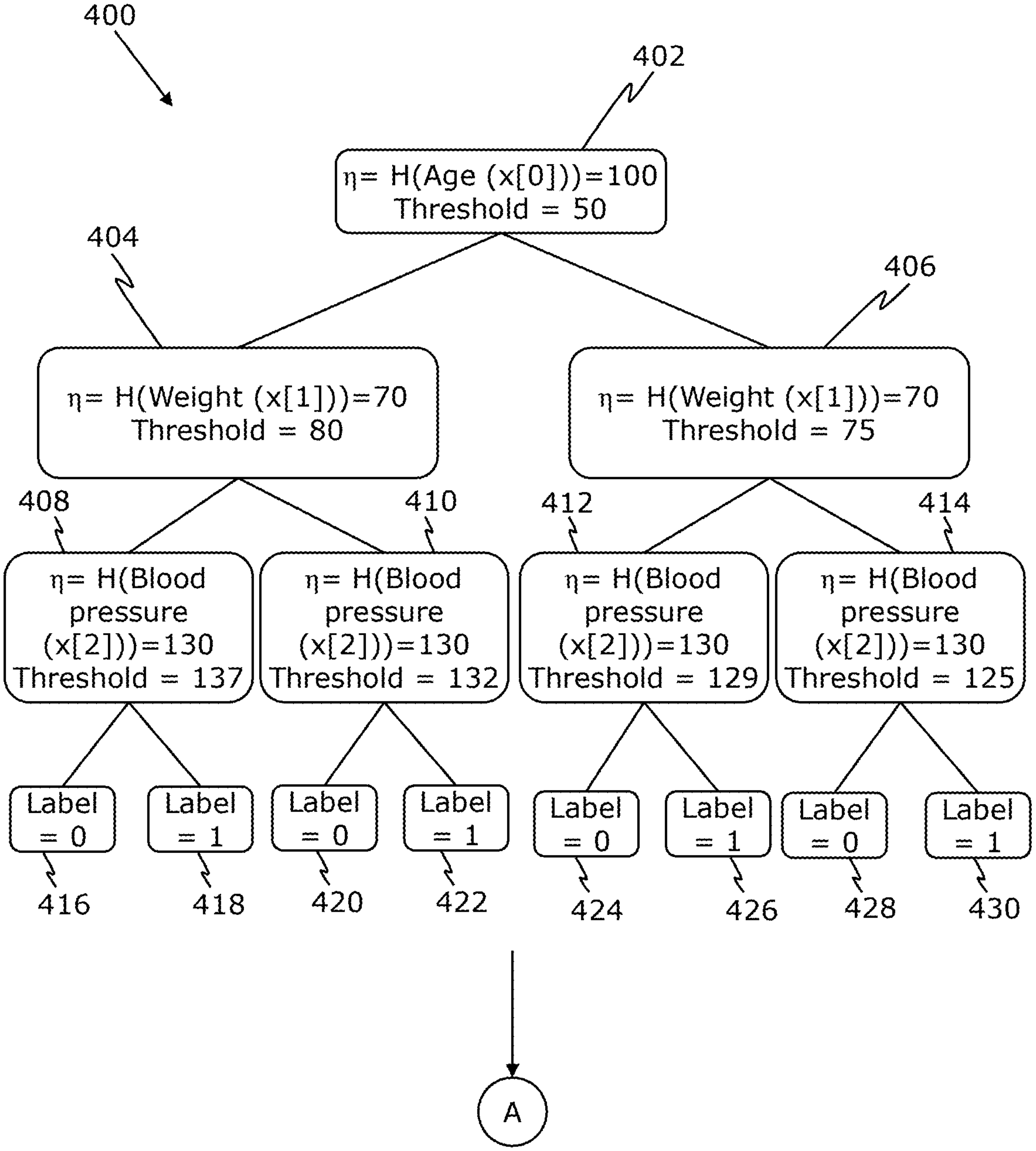
FIGS. 4A-4C illustrate an exemplary decision tree classification model and its shares, in accordance with the first embodiment of the present disclosure.
Figure 4B:
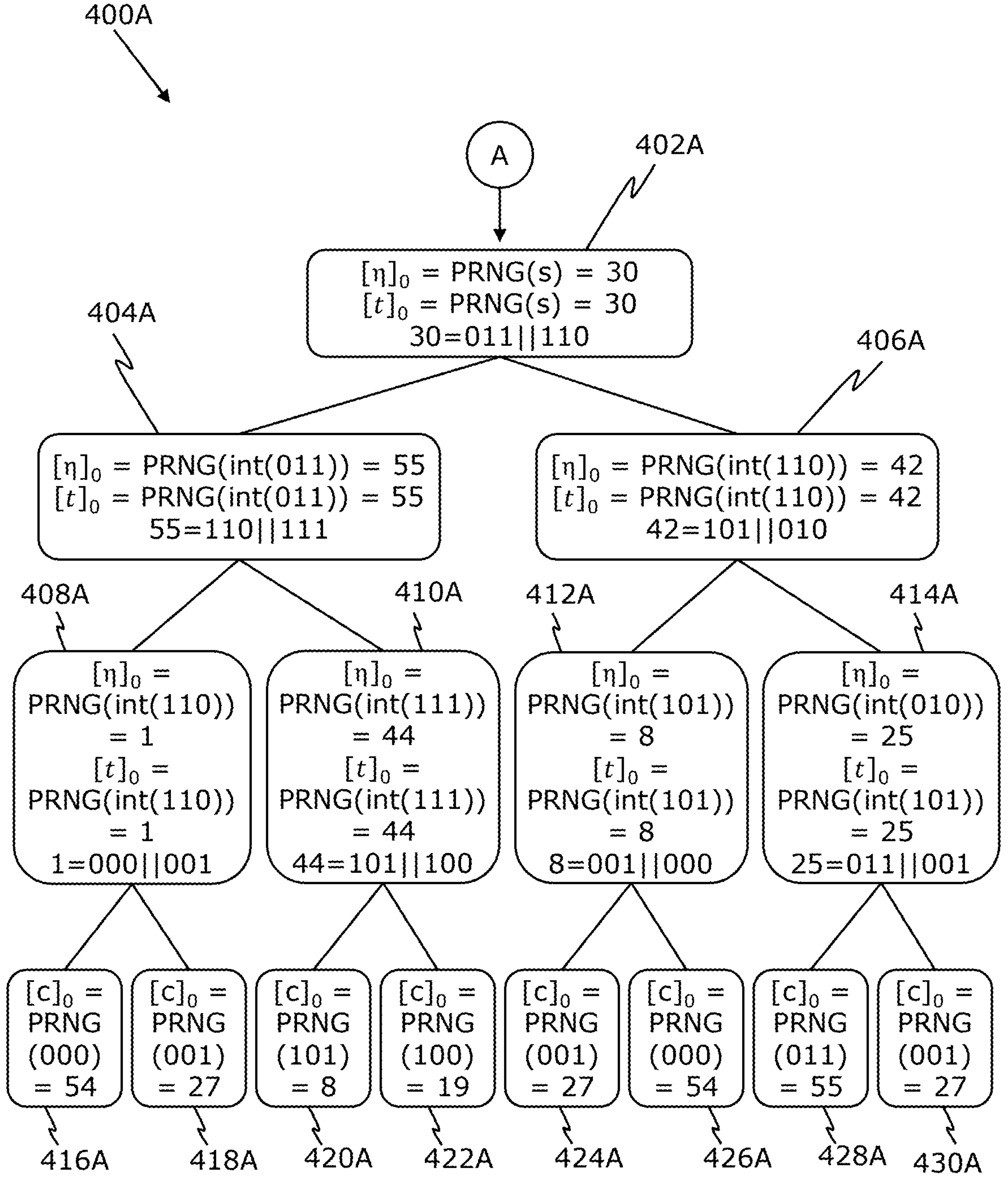
Figure 4C:
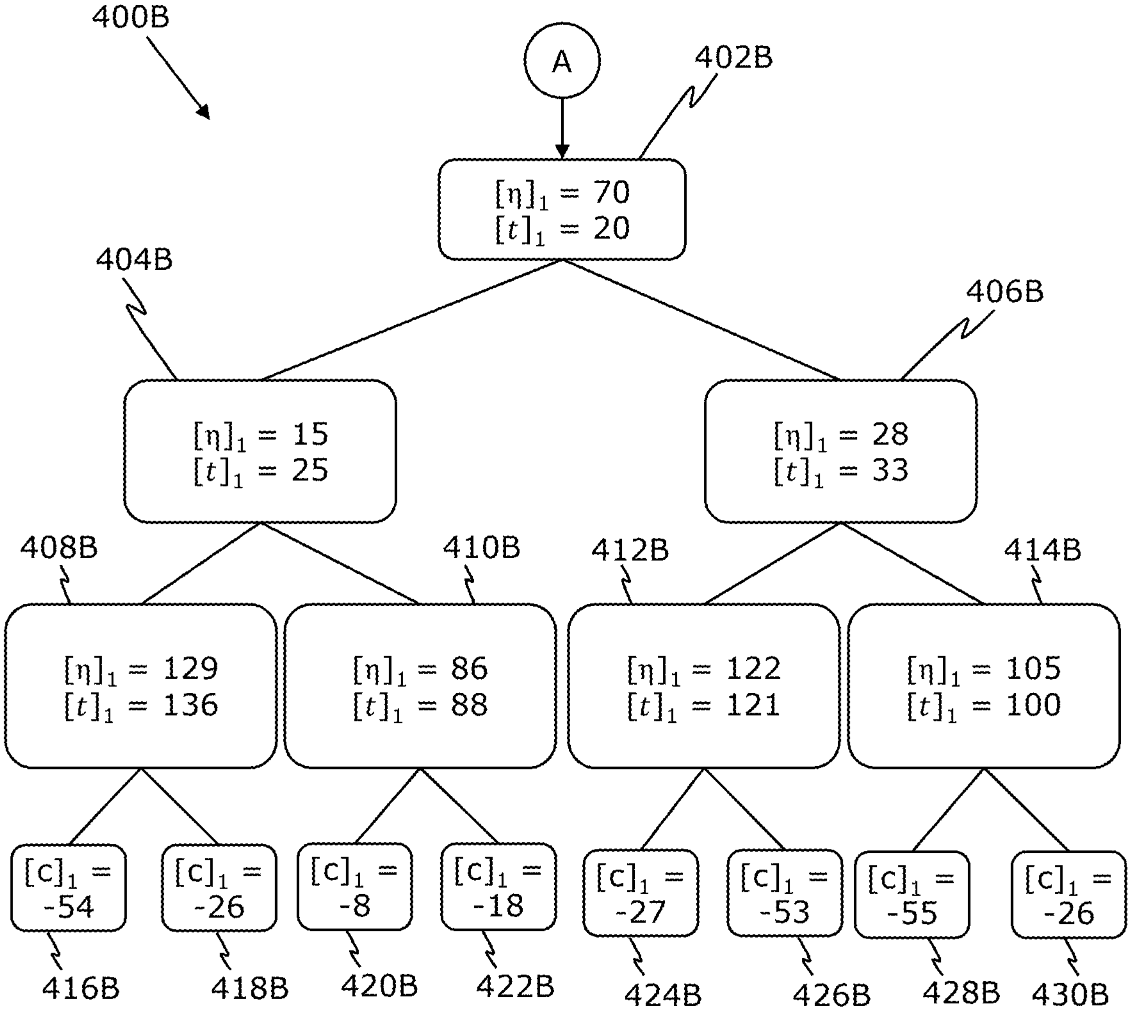

FIGS. 4A-4C illustrate an exemplary decision tree classification model and its shares, in accordance with the first embodiment of the present disclosure. FIGS. 4A, 4B, and 4C are described in conjunction with elements from FIG. 1, FIG. 2, and FIG. 3. With reference to FIG. 4A, there is shown an exemplary decision tree classification model, i.e., a decision tree 400. The root node 402 of the decision tree 400 is associated with an attribute field "Age". First nodes of the decision tree 400 that signify children of the root node 402 are associated with an attribute field "Weight". Second nodes of the decision tree 400 signifying children of the first nodes are associated with an attribute field "Blood Pressure".

The third device 106 splits the decision tree 400 into a first share of the decision tree 400A (see FIG. 4B) and a second share of the decision tree 400B (see FIG. 4C). The splitting is such that a hash value of an attribute field associated with each non-leaf node of the decision tree 400 is split into a first share of the hash value of the attribute field and a second share of the hash value of the attribute field. Furthermore, a threshold associated with each non-leaf node of the decision tree 400 is split into a first share of the threshold and a second share of the threshold. For example, a hash value ($\eta$=100) of an attribute field "Age" associated with a root node 402 of the decision tree 400 is split into a first share of the hash value ($[\eta]_0$=30) associated with a root node 402A of the first share of the decision tree 400A and a second share of the hash value ($[\eta]_1$=70) associated with a corresponding root node 402B of the second share of the decision tree 400B. Similarly, a threshold (50) associated with the root node 402 of the decision tree 400 is split into a first share of the threshold (30) associated with the root node 402A and a second share of the threshold (20) associated with the corresponding root node 402B. Furthermore, each label associated with each leaf node of the decision tree 400 is split into a first label share $[c]_0$ and a second label share $[c]_1$. For example, a label (0) associated with a leaf node 416 of the decision tree 400 is split into a first label share (54) associated with a leaf node 416A of the first share of the decision tree 400A and a second label share (−54) associated with a corresponding leaf node 416B of the second share of the decision tree 400B.

Both the first device 102 and the second device 104 iteratively execute the set of steps to traverse the first share of the decision tree 400A and the second share of the decision tree 400B, respectively. As a depth level of each of the decision tree 400, the first share of the decision tree 400A, and the second share of the decision tree 400B is "3", three iterations of execution of the set of steps will be required to reach a leaf node of the first share of the decision tree 400A and a corresponding leaf node of the second share of the decision tree 400B. A first share of the classification result is obtained after reaching the leaf node of the first share of the decision tree 400A. A second share of the classification result is obtained after reaching the corresponding leaf node of the second share of the decision tree 400B. At each iteration of execution of the set of steps a non-leaf node of the first share of the decision tree 400A and a selection of a corresponding non-leaf node of the second share of the decision tree 400B are selected based on an outcome of a secure comparison operation performed at a previous iteration. However, at a first iteration of execution of the set of steps, the first device 102 selects the root node 402A of the first share of the decision tree 400A by default and the second device 104 selects the root node 402B of the second share of the decision tree 400B by default.

At a first iteration, the first device 102 computes a first share of a threshold $[t]_0$ associated with the root node 402A of the first share of the decision tree 400A and a first share of a hash value of an attribute field (i.e., "Age") $[\eta]_0$ associated with the root node 402A of the first share of the decision tree 400A by applying a pseudo-random generator (PRNG) on the seed (s) received from the third device 106. The outcome of the PRNG application is the first share of the threshold $[t]_0$ associated with the root node 402A (i.e., 30) and the first share of the hash value of the attribute field "Age" $[\eta]_0$ (i.e., 30). It may be noted that the first device 102 is required to compute the first share of the threshold $[t]_0$ (30) and the first share of the hash value of the attribute field "Age" $[\eta]_0$ (30) associated with the root node 402A since the third device 106 does not transmit the first share of the decision tree 400A to the first device 102. On the other hand, a second share of the threshold $[t]_1$ (20) associated with the root node 402B of the second share of the decision tree 400B and a second share of the hash value of the attribute field "Age" $[\eta]_1$ (i.e., 70) associated with the root node 402B of the second share of the decision tree 400B is stored in the second device 104. This is because the third device 106 transmits the second share of the decision tree 400B to the second device 104.

Based on an outcome of the secure comparison operation performed at a first iteration, the first device 102 selects a non-leaf node 406A, which is a first child node of the root node 402A of the first share of the decision tree 400A, and the second device 104 selects a corresponding non-leaf node 406B, which is second child node of the root node 402B of the second share of the decision tree 400B.

At a second iteration, the selected non-leaf node is the first child node of the root node 402A of the first share of the decision tree 400A (or the non-leaf node 406A) and the selected corresponding non-leaf node is the second child node of the root node 402B of the second share of the decision tree 400B (or the corresponding non-leaf node 406B). The selections are based on the outcome of the secure comparison operation obtained at the first iteration. Thereafter, the first device 102 computes a first share of a threshold $[t]_0$ associated with the first child node (i.e., the non-leaf node 406A) and a first share of a hash value $[\eta]_0$ of an attribute field (i.e., "Weight") associated with the first child node (i.e., the non-leaf node 406A) by applying the PRNG on a portion of the first share of the threshold $[t]_0$ associated with the root node 402A of the first share of the decision tree 400A. The outcome of the PRNG application is the first share of the threshold associated $[t]_0$ with the non-leaf node 406A (i.e., 42) and the first share of the hash value of the attribute field "Weight" $[\eta]_0$ (i.e., 42). The portion of the first share of the threshold associated with the root node 402A is selected based on the outcome of the secure comparison operation obtained at the first iteration (involving selection of the first child node or the non-leaf node 406A). The first share of the threshold (30) associated with the root node 402A can be represented as (011110) in binary. The selection of the non-leaf node 406A leads to the selection of the portion (110). By applying the PRNG on the portion (110), the first share of the threshold $[t]_0$ associated with the non-leaf node 406A (i.e., 42) and the first share of the hash value of the attribute field "Weight" $[\eta]_0$ (i.e., 42) are obtained.

On the other hand, a second share of the threshold $[t]_1$ (33) associated with the second child node of the root node 402B (i.e., the corresponding non-leaf node 406B) of the second share of the decision tree 400B and a second share of the hash value of the attribute field "Age" $[\eta]_1$ (i.e., 70) associated with the second child node of the root node 402B (i.e., the corresponding non-leaf node 406B) of the second share of the decision tree 400B is stored in the second device 104. This is because the third device 106 transmits the second share of the decision tree 400B to the second device 104.

Based on an outcome of the secure comparison operation performed at the second iteration, the first device 102 selects a non-leaf node 414A, which is a first child node of the non-leaf node 406A of the first share of the decision tree 400A, and the second device 104 selects a corresponding non-leaf node 414B, which is second child node of the non-leaf node 406B of the second share of the decision tree 400B.

Similarly, based on an outcome of the secure comparison operation performed at the third iteration, the first device 102 selects a first leaf node 430A, which is a first child node of the non-leaf node 414A of the first share of the decision tree 400A and the second device 104 selects a corresponding second leaf node 430B, which is second child node of the corresponding non-leaf node 414B of the second share of the decision tree 400B.

At this stage, the iterative execution of the set of steps is completed. The first device 102 computes a label associated with the first leaf node 430A by applying the PRNG on a portion of the first share of the threshold associated with a non-leaf node (such as the non-leaf node 414A) of the first share of the decision tree 400A. The non-leaf node 414A is a parent node of the first leaf node 430A. The first share of the threshold $[t]_0$ associated with the non-leaf node 414A is (25). The first share of the threshold $[t]_0$ (25) associated with the non-leaf node 414A can be represented as (011001) in binary. The selection of the first leaf node 430A leads to the selection of the portion (001) of the first share of the threshold (011001). In other words, the portion (001) of the first share of the threshold (25 or 011001) associated with the parent node (i.e., the non-leaf node 414A) of the first leaf node 430A is selected based on an outcome of the secure comparison operation obtained at the final iteration involving the selection of the first leaf node 414A. By applying the PRNG on the portion (001), the label associated with the first leaf node 430A (i.e., 27) is obtained.

Based on the label associated with the first leaf node 430A, the first device 102 generates a first share of a classification result. The second device 104 generates a second share of the classification result based on a label (−26) associated with the corresponding second leaf node 430B. The label (−26) is stored in the corresponding second leaf node 430B. Thereafter, the second device 104 transmits second share of the classification result to the first device 102. Upon reception of the second share of the classification result from the second device 104, the first device 102 generates a decision tree classification result (1) based on the first share of the classification result (27) and the second share of the classification result (−26).

Figure 5A:
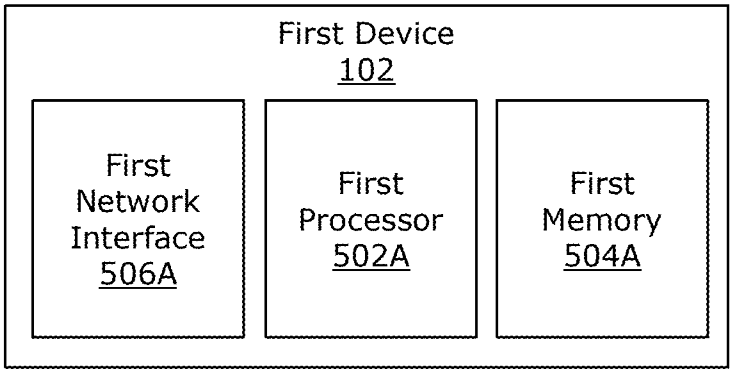
FIG. 5A-5C are block diagrams illustrating components of the entities in the exemplary networking environment, in accordance with the first embodiment of the present disclosure.
Figure 5B:
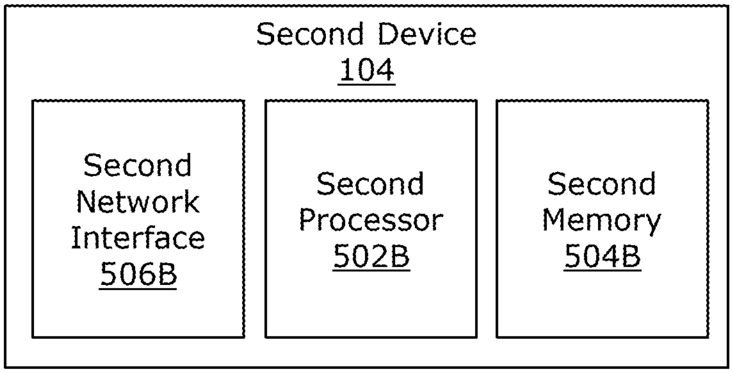
Figure 5C:
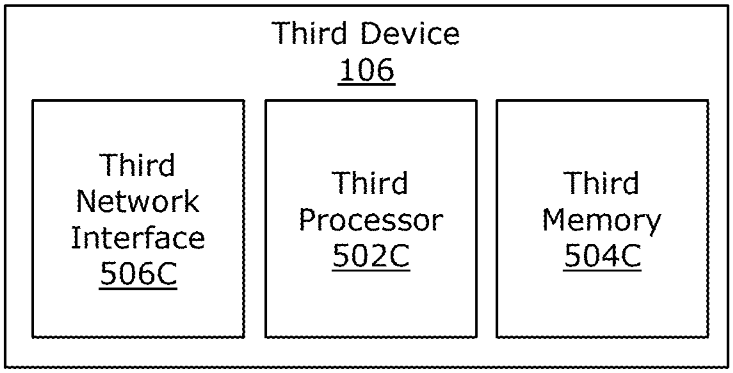

FIGS. 5A-5C are block diagrams illustrating components of the entities in the exemplary networking environment 100, in accordance with the first embodiment of the present disclosure. FIGS. 5A-5C are described in conjunction with elements from FIG. 1, FIG. 2, FIG. 3, and FIGS. 4A-4C.

With reference to FIG. 5A, there is shown the first device 102. The first device 102 includes a first processor 502A, a first memory 504A, and a first network interface 506A. The first memory 504A stores the original query data (x), the hash vector (h), the permuted query data (x') that is generated at each iteration, the permuted hash vector (h') generated at each iteration, the seed (s) (received from the third device 106), a first share of a hash value of an attribute field associated with each non-leaf node of the first share of the decision tree, a first share of an attribute-targeting vector $[\delta]_0$ generated at each iteration (received from the third device 106), the masked version of the permuted hash vector, a first share of a hash value of an attribute field associated with each non-leaf node of the first share of the decision tree, masked versions of the first share of the hash value of the attribute field generated at each iteration, the first share of the permuted query data $[x']_0$ and the second share of the permuted query data $[x']_1$ generated at each iteration, a first share of a dot product $[x_{a*}]_0$ of an attribute-targeting vector (δ) and the permuted query data (x') computed at each iteration, a first share of a threshold associated with each non-leaf node of the first share of the decision tree, masked versions of the first shares of the thresholds, the masked version of the first share of the dot product generated at each iteration, outcomes of the secure comparison operations (received from the second device 104), the first share of the classification result, the second share of the classification result (received from the second device 104), and the decision tree classification result.

In an embodiment, the first processor 502A is configured to perform a set of operations that enable generation of the first share of the classification result, the second share of a classification result, and the decision tree classification result.

The first processor 502A refers to a computational element that is operable to respond to and processes instructions that drive the first device 102. The first processor 502A may refer to one or more individual processors, processing devices, and various elements associated with a processing device that may be shared by other processing devices. Additionally, the one or more individual processors, the processing devices, and the various elements are arranged in various architectures for responding to and processing the instructions that drive the first device 102. In some implementations, the first processor 502A may be an independent unit.

Examples of the first processor 502A may include, but are not limited to, a hardware processor, a digital signal processor (DSP), a microprocessor, a microcontroller, a complex instruction set computing (CISC) processor, an application-specific integrated circuit (ASIC) processor, a reduced instruction set (RISC) processor, a very long instruction word (VLIW) processor, a state machine, a data processing unit, a graphics processing unit (GPU), and control circuitry.

The first memory 504A refers to a volatile or persistent medium, such as an electrical circuit, a magnetic disk, a virtual memory, or an optical disk, in which a computer stores data or software for any duration. Optionally, the first memory 504A is a non-volatile mass storage, such as a physical storage media. Examples of implementation of the first memory 504A may include, but are not limited to, an Electrically Erasable Programmable Read-Only Memory (EEPROM), Dynamic Random-Access Memory (DRAM), Random Access Memory (RAM), Read-Only Memory (ROM), Hard Disk Drive (HDD), Flash memory, a Secure Digital (SD) card, Solid-State Drive (SSD), and/or CPU cache memory.

The first network interface 506A refers to a communication interface to enable the first device 102 to communicate with the second device 104 and the third device 106. Examples of the first network interface 506A include, but are not limited to, a network interface card, a transceiver, and the like.

With reference to FIG. 5B, there is shown the second device 104. The second device 104 includes a second processor 502B, a second memory 504B, and a second network interface 506B. The second memory 504B stores the second share of the decision tree $[M]_1$ (received from the third device 106), the masked version of the permuted hash vector (received from the first device 102), masked versions of the first share of the hash value of the attribute field generated at each iteration (received from the first device 102), the second share of the hash value of the attribute field, an attribute-targeting vector (δ) generated at each iteration, the first share of the attribute-targeting vector $[\delta]_0$ generated at each iteration, the second share of the attribute-targeting vector $[\delta]_1$ generated at each iteration, the second share of the permuted query data $[x']_1$ generated at each iteration (received from the first device 102), a second share of a dot product $[x_{a*}]_1$ of the attribute-targeting vector (δ) and the permuted query data (x') computed at each iteration, masked versions of the first shares of the thresholds associated with the non-leaf nodes of the first share of the decision tree (received from the first device 102), the masked version of the first share of the dot product generated at each iteration, second shares of the thresholds associated with the corresponding non-leaf nodes of the second share of the decision tree, masked versions of the second shares of the thresholds, a masked version of the second share of the dot product, outcomes of the secure comparison operations, outcomes of the secure comparison operations, and the second share of the classification result.

In an embodiment, the second processor 502B is configured to perform a set of operations that enable the generation of the first share of the classification result, the second share of a classification result, and the decision tree classification result.

The second processor 502B refers to a computational element that is operable to respond to and processes instructions that drive the second device 104. The second processor 502B may refer to one or more individual processors, processing devices, and various elements associated with a processing device that may be shared by other processing devices. Additionally, the one or more individual processors, the processing devices, and the various elements are arranged in various architectures for responding to and processing the instructions that drive the second device 104. In some implementations, the second processor 502B may be an independent unit.

Examples of the second processor 502B may include, but are not limited to, a hardware processor, a microprocessor, a microcontroller, a DSP, a CISC processor, an ASIC processor, a VLIW processor, a RISC processor, a data processing unit, a GPU, a state machine, and other processors or control circuitry.

The second memory 504B refers to a volatile or persistent medium, such as an electrical circuit, a magnetic disk, a virtual memory, or an optical disk, in which a computer can store data or software for any duration. Optionally, the second memory 504B is a non-volatile mass storage, such as a physical storage media. Examples of implementation of the second memory 504B include, but are not limited to, an EEPROM, a DRAM, a RAM, a ROM, a HDD, a Flash memory, a SD card, a SSD, and/or a CPU cache memory.

The second network interface 506B refers to a communication interface to enable the second device 104 to communicate with the first device 102 and the third device 106. Examples of the second network interface 506B include, but are not limited to, a network interface card, a transceiver, and the like.

With reference to FIG. 5C, there is shown the third device 106. The third device 106 includes a third processor 502C, a third memory 504C, and a third network interface 506C. The third memory 504C stores the decision tree, the first share of the decision tree, the second share of the decision tree and the seed (s).

In an embodiment, the third processor 502C is configured to perform a set of operations that enable the generation of the first share of the classification result, the second share of a classification result, and the decision tree classification result.

The third processor 502C refers to a computational element that is operable to respond to and processes instructions that drive the third device 106. The third processor 502C may refer to one or more individual processors, processing devices, and various elements associated with a processing device that may be shared by other processing devices. Additionally, the one or more individual processors, the processing devices, and the various elements are arranged in various architectures for responding to and processing the instructions that drive the third device 106. In some implementations, the third processor 502C may be an independent unit.

Examples of the third processor 502C may include, but are not limited to, a hardware processor, a microprocessor, a microcontroller, a DSP, a CISC processor, an ASIC processor, a VLIW processor, a RISC processor, a data processing unit, a GPU, a state machine, and other processors or control circuitry.

The third memory 504C refers to a volatile or persistent medium, such as an electrical circuit, a magnetic disk, a virtual memory, or an optical disk, in which a computer can store data or software for any duration. Optionally, the third memory 504C is a non-volatile mass storage, such as a physical storage media. Examples of implementation of the third memory 504C include, but are not limited to, an EEPROM, a DRAM, a RAM, a ROM, a HDD, a Flash memory, a SD card, a SSD, and/or a CPU cache memory.

The third network interface 506C refers to a communication interface to enable the third device 106 to communicate with the first device 102 and the second device 104. Examples of the third network interface 506C include, but are not limited to, a network interface card, a transceiver, and the like.

Figure 6:
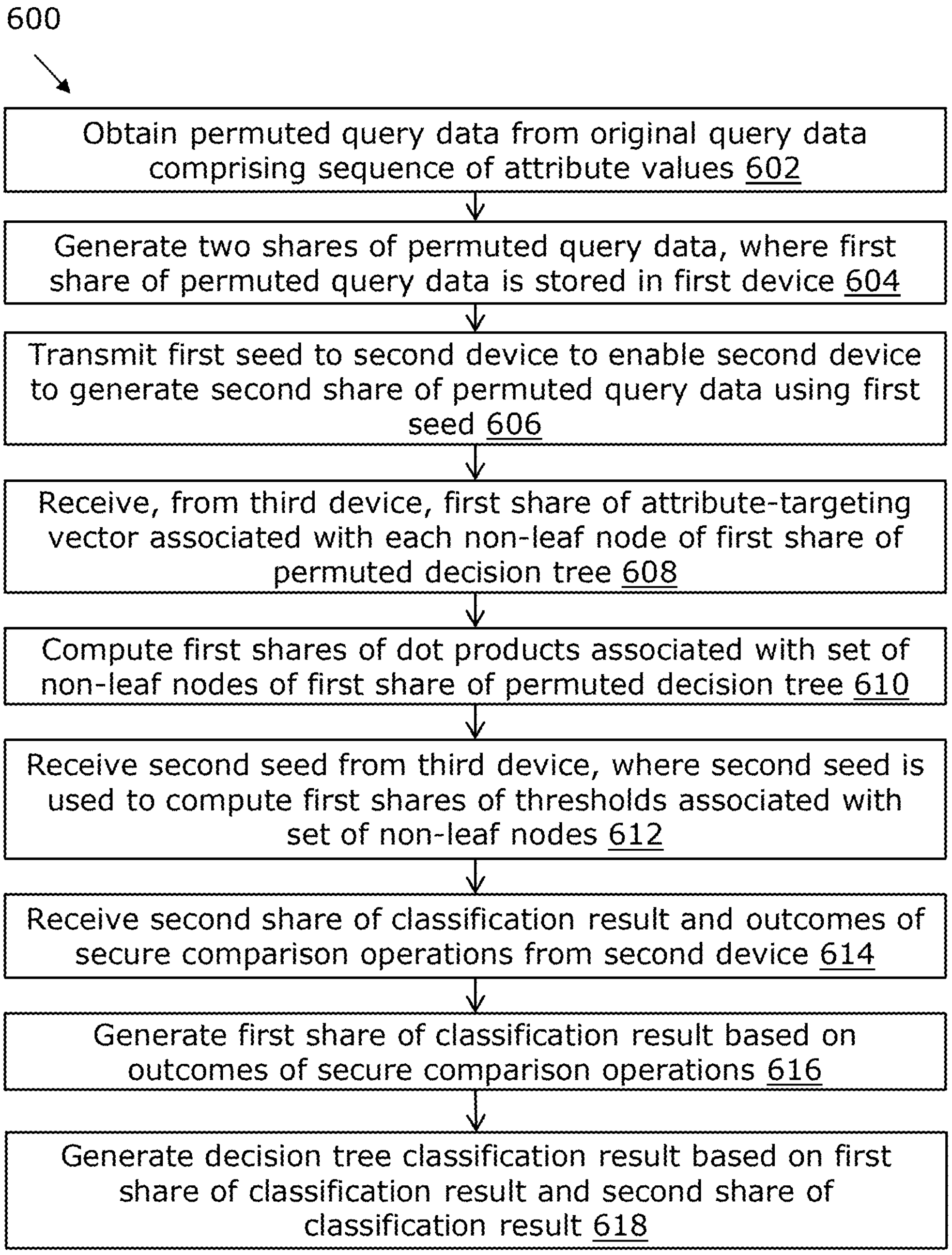
FIG. 6 is a flowchart that illustrates steps of a method for outsourcing decision tree inference while involving decision tree attribute obfuscation, in accordance with a second embodiment of the present disclosure.

FIG. 6 is a flowchart 600 that illustrates steps of a method for outsourcing decision tree inference while involving decision tree attribute obfuscation, in accordance with the second embodiment of the present disclosure. FIG. 6 is described in conjunction with elements from FIG. 1. With reference to FIG. 6, there is shown the flowchart 600. The flowchart 600 includes steps 602-618. The first device 102 is configured to execute the method for outsourcing inference of a decision tree whose attributes are obfuscated during the inference. At step 602, the method includes obtaining, by use of the first device 102, a permuted query data from an original query data comprising a sequence of attribute values, wherein the sequence of attribute values is altered based on a permutation matrix to generate the permuted query data. At step 604, the method includes generating, by use of the first device 102, two shares of the permuted query data, wherein a first share of the permuted query data is stored in the first device 102. At step 606, the method includes transmitting, by the first device 102 to the second device 104, a first seed to enable the second device 104 to generate a second share of the permuted query data using the first seed.

At step 608, the method includes receiving, by the first device 102 from the third device 106, a first share of an attribute-targeting vector associated with each non-leaf node of a first share of a permuted decision tree. The second device 104 receives, from the third device 106, a second share of the attribute-targeting vector associated with each corresponding non-leaf node of a second share of the permuted decision tree. At step 610, the method includes computing, by the first device 102, first shares of dot products associated with a set of non-leaf nodes of the first share of the permuted decision tree based on first shares of attribute-targeting vectors associated with the set of non-leaf nodes and the first share of the permuted query data. The second device 104 computes second shares of the dot products associated with a set of corresponding non-leaf nodes of the second share of the permuted decision tree based on second shares of the attribute-targeting vectors associated with the set of corresponding non-leaf nodes and the second share of the permuted query data.

At step 612, the method includes receiving, by the first device 102 from the third device 106, a second seed. The second seed is used by the first device 102 to compute first shares of thresholds associated with the set of non-leaf nodes of the first share of the permuted decision tree. The second device 104 receives, from the third device 106, second shares of the thresholds associated with the set of corresponding non-leaf nodes of the second share of the permuted decision tree. At step 614, the method includes receiving, by the first device 102 from the second device 104, a second share of a classification result and outcomes of secure comparison operations. The second share of the classification result is generated based on the outcomes of the secure comparison operations. The secure comparison operations are performed based on masked versions of each of the first shares of the thresholds associated with the set of non-leaf nodes, the first shares of the dot products associated with the set of non-leaf nodes, the second shares of the thresholds associated with the set of corresponding non-leaf nodes, and the second shares of the dot products associated with the set of corresponding non-leaf nodes.

At step 616, the method includes generating, by the first device 102 a first share of the classification result based on the outcomes of the secure comparison operations. At step 618, the method includes generating, by use of the first device 102, a decision tree classification result based on the first share of the classification result and the second share of the classification result.

The steps 602-618 are illustrative, and other alternatives can also be provided where one or more steps are added, one or more steps are provided in a different sequence, or one or more steps are eliminated, without departing from the scope of the claims herein.

There is provided a computer program comprising instructions for carrying out all the steps of the method. The computer program is executed on the first device 102 in conjunction with the second device 104 and the third device 106. The computer program is implemented as an algorithm, embedded in a software stored in the non-transitory computer-readable storage medium that has program instructions stored thereon, the program instructions being executable by the one or more processors in the computer system to execute the method illustrated using the flowchart 600. The non-transitory computer-readable storage means may include, but are not limited to, an electronic storage device, a magnetic storage device, an optical storage device, an electromagnetic storage device, a semiconductor storage device, or any suitable combination of the foregoing. Examples of implementation of computer-readable storage medium, but are not limited to, an EEPROM, a RAM, a ROM, an HDD, a Flash memory, an SD card, a SSD, a computer-readable storage medium, and/or a CPU cache memory.

Figure 7:
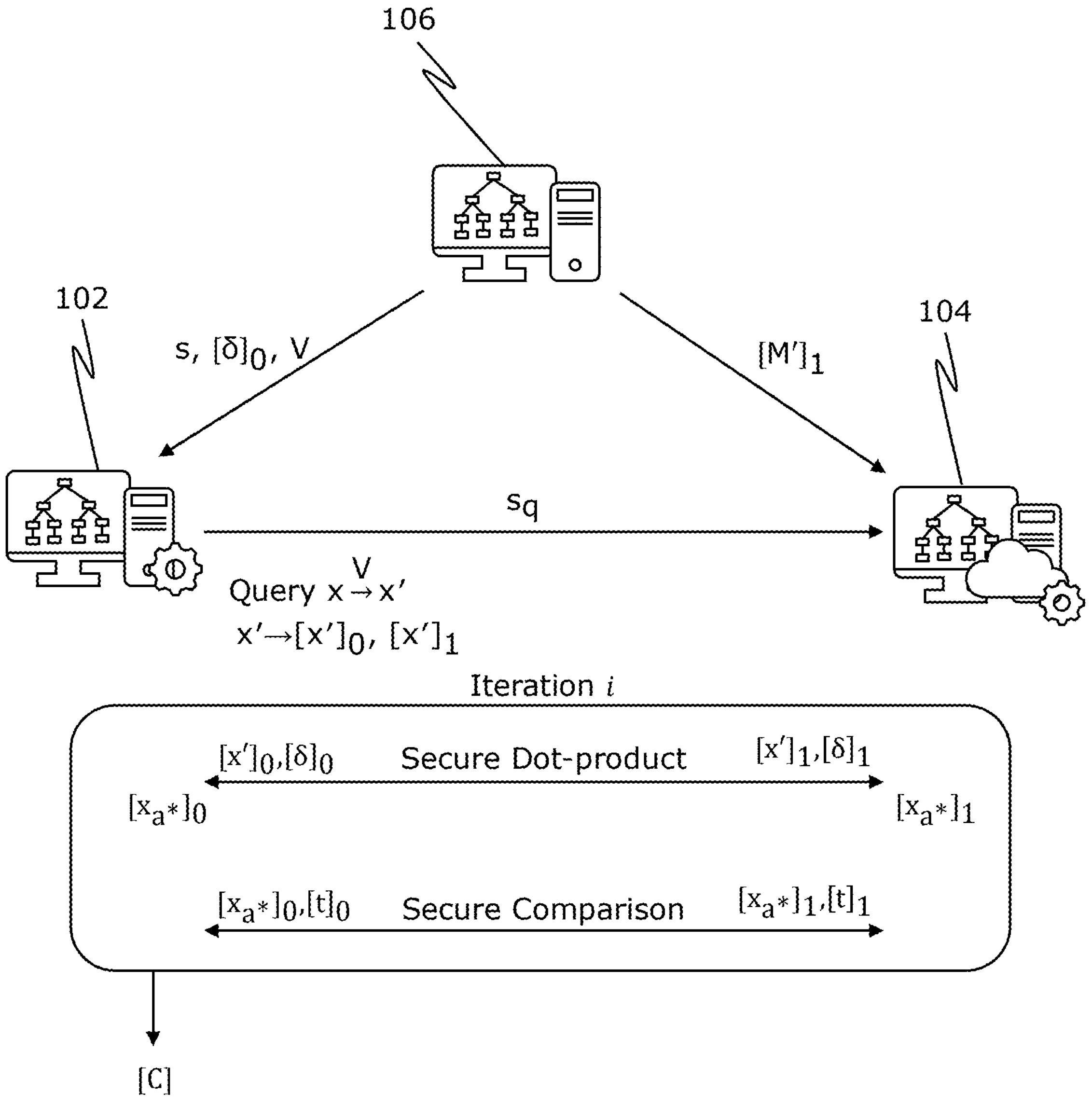
FIG. 7 illustrates an information exchange between entities of the networking environment for outsourcing inference of a decision tree classification model and obfuscating attributes of the decision tree classification model during the inference, in accordance with the second embodiment of the present disclosure.

FIG. 7 illustrates an information exchange between entities of the networking environment 100 for outsourcing inference of a decision tree classification model and obfuscating attributes of the decision tree classification model during the inference, in accordance with the second embodiment of the present disclosure. FIG. 7 is described in conjunction with elements from FIG. 1 and FIG. 6. With reference to FIG. 7, there is shown the information exchange between the first device 102, the second device 104, and the third device 106 (the entities of the networking environment 100). The third device 106 defines an attribute sequence vector "V". The attribute sequence vector "V" is a permuted sequence of attributes. The permuted sequence of attributes is a vector that may be obtained based on an outcome of a product of a permutation matrix "A" (generated by the third device 106) and a matrix including a sequence of attributes ($v_b$). For example, the sequence of attributes may be [$a_1$, $a_2$, $a_3$], were $a_1$ is a first attribute "Blood Pressure", $a_2$ is a second attribute "Age", and $a_3$ is a third attribute "Weight". Furthermore, the permutation matrix, i.e., "A" may be as follows:

$$A = \begin{bmatrix} A_{11} & A_{12} & A_{13} \\ A_{21} & A_{22} & A_{23} \\ A_{31} & A_{32} & A_{33} \end{bmatrix} = \begin{bmatrix} 0 & 1 & 0 \\ 0 & 0 & 1 \\ 1 & 0 & 0 \end{bmatrix}$$

Thus, the product of A and $v_b$ (i.e., attribute sequence vector or "V") is [$a_2$, $a_3$, $a_1$] or [Age, Weight, Blood Pressure]. Based on "V", the third device 106 obtains a permuted decision tree (M') from an original decision tree (M), i.e., an original decision tree. The original decision tree (M) is permuted (resulting in M') in order to obfuscate attributes that are associated with non-leaf nodes of (M). For instance, a root node of (M) is associated with the first attribute "Blood Pressure", first nodes signifying children of the root node are associated with the second attribute "Age", and second nodes signifying children of the first nodes are associated with the third attribute "Weight". Based on the abovementioned example of "V", i.e., [$a_2$, $a_3$, $a_1$], the original decision tree is permuted such that a root node of the permuted decision tree (M') is associated with the second attribute "Age", first nodes signifying children of the root node of (M') are associated with the third attribute "Weight", and second nodes signifying children of the first nodes of (M') are associated with the first attribute "Blood Pressure".

The third device 102 further generates an attribute targeting vector (δ) associated with each non-leaf node of the permuted decision tree (M'). The attribute-targeting vector (δ) associated with a non-leaf node of the permuted decision tree (M') is indicative of a position of an attribute, to which the non-leaf node is associated, in the sequence of attributes ($v_b$). For instance, the non-leaf node may be associated with $a_1$, i.e., the first attribute "Blood Pressure". As "Blood Pressure" is in a first position in the sequence of attributes ($v_b$), i.e., [$a_1$, $a_2$, $a_3$], the attribute-targeting vector (δ) associated with the non-leaf node will be [1, 0, 0]. Thus, an element at a particular position in (δ) having a value of "1" indicates presence of a certain attribute at a corresponding position in ($v_b$). Similarly, if the non-leaf node is associated with $a_2$, i.e., the second attribute "Age", then the attribute-targeting vector (δ) associated with the non-leaf node will be [0, 1, 0]. This is because "Age" is in a second position in the sequence of attributes ($v_b$), i.e., [$a_1$, $a_2$, $a_3$]. Furthermore, if the non-leaf node is associated with $a_3$, i.e., the third attribute "Weight", then the attribute-targeting vector (δ) associated with the non-leaf node will be [0, 0, 1]. This is because "Weight" is in a third position in the sequence of attributes ($v_b$), i.e., [$a_1$, $a_2$, $a_3$].

The third device 106 splits the permuted decision tree (M'), i.e., the decision tree classification model, to generate shares of the permuted decision tree. The shares include a first share of the permuted decision tree $[M']_0$ and a second share of the permuted decision tree $[M']_1$. The splitting is such that a threshold and an attribute targeting vector (δ) associated with each non-leaf node of (M') is split. The threshold associated with a non-leaf node of the permuted decision tree (M') is split into a first share of the threshold $[t]_0$ associated with a non-leaf node of the first share of the permuted decision tree $[M']_0$ and a second share of the threshold $[t]_1$ associated with a corresponding non-leaf node of the second share of the permuted decision tree $[M']_1$ based on additive secret sharing.

Similarly, the attribute targeting vector (δ) associated with a non-leaf node of the permuted decision tree (M') is split into a first share of the attribute targeting vector $[\delta]_0$ associated with a non-leaf node of the first share of the permuted decision tree $[M']_0$ and a second share of the attribute targeting vector $[\delta]_1$ associated with a corresponding non-leaf node of the second share of the permuted decision tree $[M']_1$ based on additive secret sharing. Thus, an accumulation of each element in the first share of the attribute targeting vector $[\delta]_0$ associated with the non-leaf node of the first share of the permuted decision tree $[M']_0$ and a corresponding element in the second share of the attribute targeting vector $[\delta]_1$ associated with the corresponding non-leaf node of the second share of the permuted decision tree $[M']_1$ is equal to an element of the attribute targeting vector (δ) associated with the non-leaf node of the permuted decision tree (M').

Furthermore, the splitting of the permuted decision tree is such that a label associated with each leaf node of (M') is split into a first share of the label and a second share of the label based on additive secret sharing. Thus, an accumulation of the first share of the label and the second share of the label is equal to the label.

Thereafter, the third device 106 may transmit the attribute sequence vector, i.e., "V", and a first share of an attribute-targeting vector $[\delta]_0$ associated with each non-leaf node of the first share of the permuted decision tree $[M']_0$ to the first device 102. The third device 106 may further transmit the second share of the permuted decision tree $[M']_1$ to the second device 104. The transmission includes an attribute and a second share of the attribute-targeting vector $[\delta]_1$ associated with each corresponding non-leaf node of the second share of the permuted decision tree $[M']_1$.

Upon reception of the attribute sequence vector, i.e., "V", the first device 102 alters a sequence of attribute values that constitute an original query data (x) based on the permuted sequence of attributes (i.e., the attribute sequence vector "V"). For example, the original query data constituting the sequence of attribute values is [x(0), x(1), x(2)], wherein x(0) is an attribute value of the first attribute "Blood Pressure", x(1) is an attribute value of the second attribute "Age", and x(2) is an attribute value of the third attribute "Weight". If "V" is [$a_2$, $a_3$, $a_1$], then elements of "x", i.e., x(0), x(1), and x(2), are relocated in accordance to "V". The sequence of attribute values is altered to obtain a permuted query data (x'). The permuted query data (x') is [x(1), x(2), x(0)].

The first device 102 further applies additive secret sharing on the permuted query data (x') to split the permuted query data (x') into two shares. The split leads to generation of a first share of the permuted query data $[x']_0$ and a second share of the permuted query data $[x']_1$. For example, if $[x']=[x(1), x(2), x(0)]^T$, then $[x']_0$, i.e., the first share of the permuted query data, is $[\{x(1)\}_0, \{x(2)\}_0, \{x(0)\}_0]^T$ and "$[x']_1$", i.e., the second share of the permuted query data is $[\{x(1)\}_1, \{x(2)\}_1, \{x(0)\}_1]^T$.

The first device 102 generates a first seed ($s_q$) such that it is possible to generate second share of the permuted query data "$[x']_1$" using the first seed ($s_q$). The first device 102 transmits the first seed ($s_q$) to the second device 104 to enable the second device 104 to generate the second share of the permuted query data $[x']_1$ using "$s_q$". This reduces significant transmission overhead involved in transmitting $[x']_1$ from the first device 102 to the second device 104. The second device 104 may apply a pseudo-random generator (PRNG) on the first seed ($s_q$) to generate a first element of the second share of the permuted query data. Thus, PRNG ($s_q$) is $\{x(1)\}_1$. Furthermore, an application of the PRNG on the first element leads to a generation of a second element of the second share of the permuted query data. Thus, PRNG ($\{x(1)\}_1$) is $\{x(2)\}_1$. Furthermore, an application of the PRNG on a second-last element of the permuted query data leads to a generation of a last element of the second share of the permuted query data. Thus, PRNG($\{x(2)\}_1$) is $\{x(0)\}_1$.

Furthermore, the third device 106 transmits a second seed (s) to the first device 102. The seed "s" enables the first device 102 to compute first shares of thresholds associated with the set of non-leaf nodes of the first share of the permuted decision tree $[M']_0$. Specifically, the second seed enables the first device 102 to compute a first share of a threshold associated with a root node of the first share of the permuted decision tree $[M']_0$. The computation of a first share of a threshold associated with a non-leaf node (apart from the root node) of the set of non-leaf nodes is computed based on a first share of a threshold associated with a parent non-leaf node. Also, as the third device 106 transmits the second share of the permuted decision tree $[M']_1$ to the second device 104, second shares of the thresholds associated with the set of corresponding non-leaf nodes of the second share of the permuted decision tree $[M']_1$ are received by the second device 104 from the third device 106. The second device 104 receives second shares of thresholds associated with all non-leaf nodes (including the set of corresponding non-leaf nodes) of the second share of the permuted decision tree $[M']_1$.

Thereafter, the first device 102 receives the first share of the attribute-targeting vector $[\delta]_0$ associated with each non-leaf node of the first share of the permuted decision tree $[M']_0$ from the third device 106. The second device 104 receives the second share of the attribute-targeting vector $[\delta]_1$ associated with each corresponding non-leaf node of the second share of the permuted decision tree $[M']_1$ from the third device 106. After the reception, the first device 102 computes first shares of dot products associated with a set of non-leaf nodes of the first share of the permuted decision tree $[M']_0$ and the second device 104 computes second shares of the dot products associated with a set of corresponding non-leaf nodes of the second share of the permuted decision tree $[M']_1$. The computation of the first shares of the dot products is based on first shares of attribute-targeting vectors associated with the set of non-leaf nodes and the first share of the permuted query data $[x']_0$. On the other hand, the computation of the second shares of the dot products is based on second shares of the attribute-targeting vectors associated with the set of corresponding non-leaf nodes and the second share of the permuted query data.

The set of non-leaf nodes includes non-leaf nodes that form a path from a root node to a leaf node of the first share of the permuted decision tree. The first device 102 computes a first share of a dot product associated with each non-leaf node of the set of non-leaf nodes. The path initially includes only the root node and is incrementally formed based on outcomes of secure comparison operations (discussed later). Each secure comparison operation involves traversal from a non-leaf node (such as the root node) to a child node which could be another non-leaf node or a leaf node. The traversal leads to an inclusion of the child node in the path. Prior to each secure comparison operation, a first share of a dot product associated with the non-leaf node is computed. After a series of traversals leading to a leaf node, a first share of a classification result is obtained.

The set of corresponding non-leaf nodes includes non-leaf nodes of the second share of the permuted decision tree that correspond to the set of non-leaf nodes of the first share of the permuted decision tree. The set of corresponding non-leaf nodes form a corresponding path from a corresponding root node to a corresponding leaf node of the second share of the permuted decision tree. The corresponding path initially includes only the corresponding root node and is incrementally formed based on outcomes of secure comparison operations (discussed later). Each secure comparison operation involves traversal from a corresponding non-leaf node (such as the corresponding root node) to a child node which could be another corresponding non-leaf node or a leaf node. The traversal leads to an inclusion of the child node in the corresponding path. Prior to each secure comparison operation, a second share of a dot product associated with the corresponding non-leaf node is computed. After a series of traversals leading to a corresponding leaf node, a second share of a classification result is obtained.

The computation of a first share of a dot product associated with a non-leaf node of the set of non-leaf nodes of the first share of the permuted decision tree involves the first device 102 obtaining of a first share of the attribute-targeting vector $[\delta]_0$ associated with the non-leaf node and the first share of the permuted query data $[x']_0$. The first device 102 further obtains a first share of a first beaver triple $[p]_0$, a first share of a second beaver triple $[q]_0$, and a first share of a third beaver triple $[r]_0$. The first share of the third beaver triple $[r]_0$ is generated based on the first share of the first beaver triple $[p]_0$, the second share of the second beaver triple $[q]_1$, and a constant (T).

The first device 102 masks the first share of the attribute-targeting vector $[\delta]_0$ associated with the non-leaf node by use of the first share of the first beaver triple $[p]_0$ to generate a masked version of the first share of the attribute-targeting vector associated with the non-leaf node. The first device 102 masks the first share of the permuted query data $[x']_0$ by use of the first share of the second beaver triple $[q]_0$ to generate a masked version of the first share of the permuted query data. Furthermore, the first device 102 transmits the masked version of the first share of the attribute-targeting vector associated with the non-leaf node and the masked version of the first share of the permuted query data to the second device 104.

The computation of the first share of the dot product associated with the non-leaf node of the set of non-leaf nodes of the first share of the permuted decision tree further involves the first device 102 receiving, from the second device, a masked version of a second share of the attribute-targeting vector associated with a corresponding non-leaf node of the set of corresponding non-leaf nodes and a masked version of the second share of the permuted query data. The second device 104 obtains a second share of the first beaver triple $[p]_1$, a second share of the second beaver triple $[q]_1$, and a second share of the third beaver triple $[r]_1$. The second share of the third beaver triple $[r]_1$ is generated based on the second share of the first beaver triple $[p]_1$, the first share of the second beaver triple $[q]_0$, and the constant (T). The second device 104 masks the second share of the attribute-targeting vector $[\delta]_1$ by use of the second share of the first beaver triple $[p]_0$ to generate the masked version of the second share of the attribute-targeting vector. Furthermore, the second device 104 masks the second share of the permuted query data $[x']_1$ by use of the second share of the second beaver triple $[q]_1$ to generate the masked version of the second share of the permuted query data. The second device 104 further transmits the masked version of the second share of the attribute-targeting vector and the masked version of the second share of the permuted query data to the first device 102.

Upon receiving the masked version of the second share of the attribute-targeting vector, and the masked version of the second share of the permuted query data, the first device 102 computes the first share of the dot product $[x_{a*}]_0$ associated with the non-leaf node of the set of non-leaf nodes of the first share of the permuted decision tree. The computation is based on the first share of the attribute-targeting vector $[\delta]_0$ associated with the non-leaf node, the first share of the permuted query data $[x']_0$, the masked version of the second share of the attribute-targeting vector associated with the corresponding non-leaf node, the masked version of the second share of the permuted query data, the first share of the second beaver triple $[q]_0$, and the first share of the third beaver triple $[r]_0$.

Similarly, upon receiving the masked version of the first share of the attribute-targeting vector associated with the non-leaf node of the first share of the permuted decision tree and the masked version of the first share of the permuted query data, the second device 104 computes the second share of the dot product $[x_{a*}]_1$ associated with the corresponding non-leaf node of the set of corresponding non-leaf nodes of the second share of the permuted decision tree. The computation is based on the second share of the attribute-targeting vector $[\delta]_1$ associated with the corresponding non-leaf node of the second share of the permuted decision tree, the second share of the permuted query data $[x']_1$, the masked version of the first share of the attribute-targeting vector associated with the non-leaf node, the masked version of the first share of the permuted query data, the second share of the second beaver triple $[q]_0$, and the second share of the third beaver triple $[r]_1$.

The second device 104 may perform a predefined number of secure comparison operations for obtaining a decision tree classification result (c). The secure comparison operations are performed based on masked versions of each of the first shares of the thresholds associated with the set of non-leaf nodes, the first shares of the dot products associated with the set of non-leaf nodes, the second shares of the thresholds associated with the set of corresponding non-leaf nodes, and the second shares of the dot products associated with the set of corresponding non-leaf nodes.

Each secure comparison involves a selection of a non-leaf node of the set of non-leaf nodes by the first device 102 and a selection of a corresponding non-leaf node of the set of corresponding non-leaf nodes by the second device 104. The first device 102 masks each of a first share of a threshold associated with the selected non-leaf node and a first share of a dot product associated with the selected non-leaf node. The first device 104 further transmits masked versions of each of the first share of the threshold associated with the selected non-leaf node and the first share of the dot product associated with the selected non-leaf node of the set of non-leaf nodes to the second device 104. The second device 104, on the other hand, masks a second share of the threshold associated with the selected corresponding non-leaf node and a second share of the dot product associated with the selected corresponding non-leaf node. The second device 104 performs a comparison between an accumulation of the masked version of the first share of the threshold associated with the selected non-leaf node and the masked version of the second share of the threshold associated with the selected corresponding non-leaf node and an accumulation of the masked version of the first share of the dot product associated with the selected non-leaf node and the masked version of the second share of the dot product associated with the selected corresponding non-leaf node. Based on the comparison, there is a traversal from the selected non-leaf node to a child node of the selected non-leaf node and a traversal from the selected corresponding non-leaf node to a corresponding child node of the selected corresponding non-leaf node. Thus, an outcome of the secure comparison operation leads to selections of the child node and the corresponding child node. In a subsequent secure comparison operation, the selected child node is the selected non-leaf node, and the selected corresponding child node is the selected corresponding non-leaf node. The performance of the secure comparison operations is discussed with an example in FIGS. 8A-8D.

The performance of the predefined number of secure comparison operations results in a traversal from the root node of the first share of the permuted decision tree $[M]_0$ to a leaf node of the first share of the permuted decision tree $[M]_0$ and a traversal from the corresponding root node of the second share of the permuted decision tree $[M]_1$ to a corresponding leaf node of the second share of the permuted decision tree $[M]_1$. The first device 102 generates a first share of a classification result $[c]_0$ based on a label associated with the leaf node of the first share of the permuted decision tree $[M]_0$. The second device 104 generates a second share of the classification result $[c]_1$ based on a label associated with the corresponding leaf node of the second share of the permuted decision tree $[M]_1$. Thereafter, the second device 104 transmits the second share of the classification result $[c]_1$ to first device 102. The first device 102 generates a decision tree classification result based on the first share of the classification result $[c]_0$ and the second share of the classification result $[c]_1$.

Figure 8A:
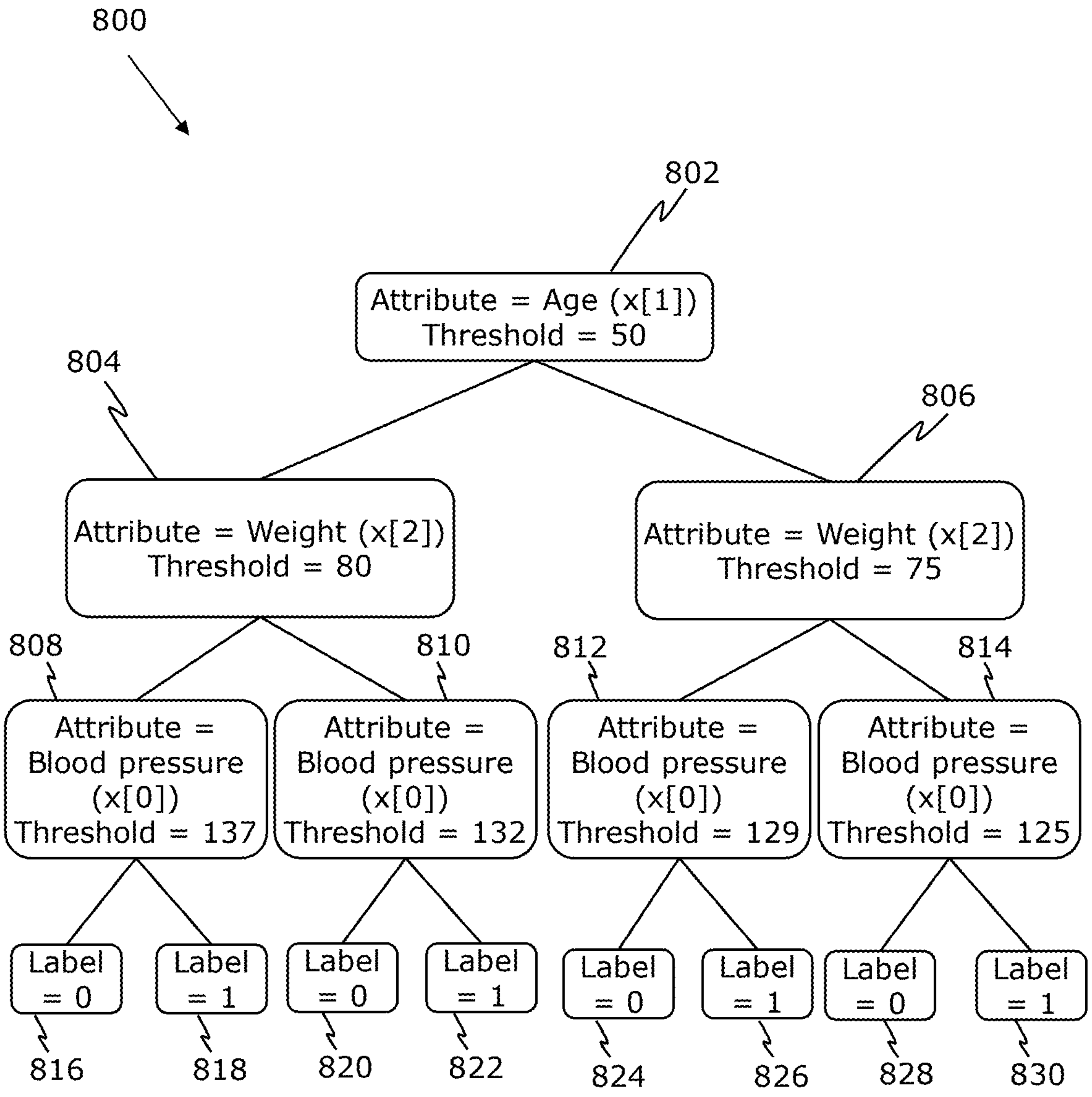
FIGS. 8A-8D illustrate an exemplary permuted decision tree classification model and its shares, in accordance with the second embodiment of the present disclosure.
Figure 8B:
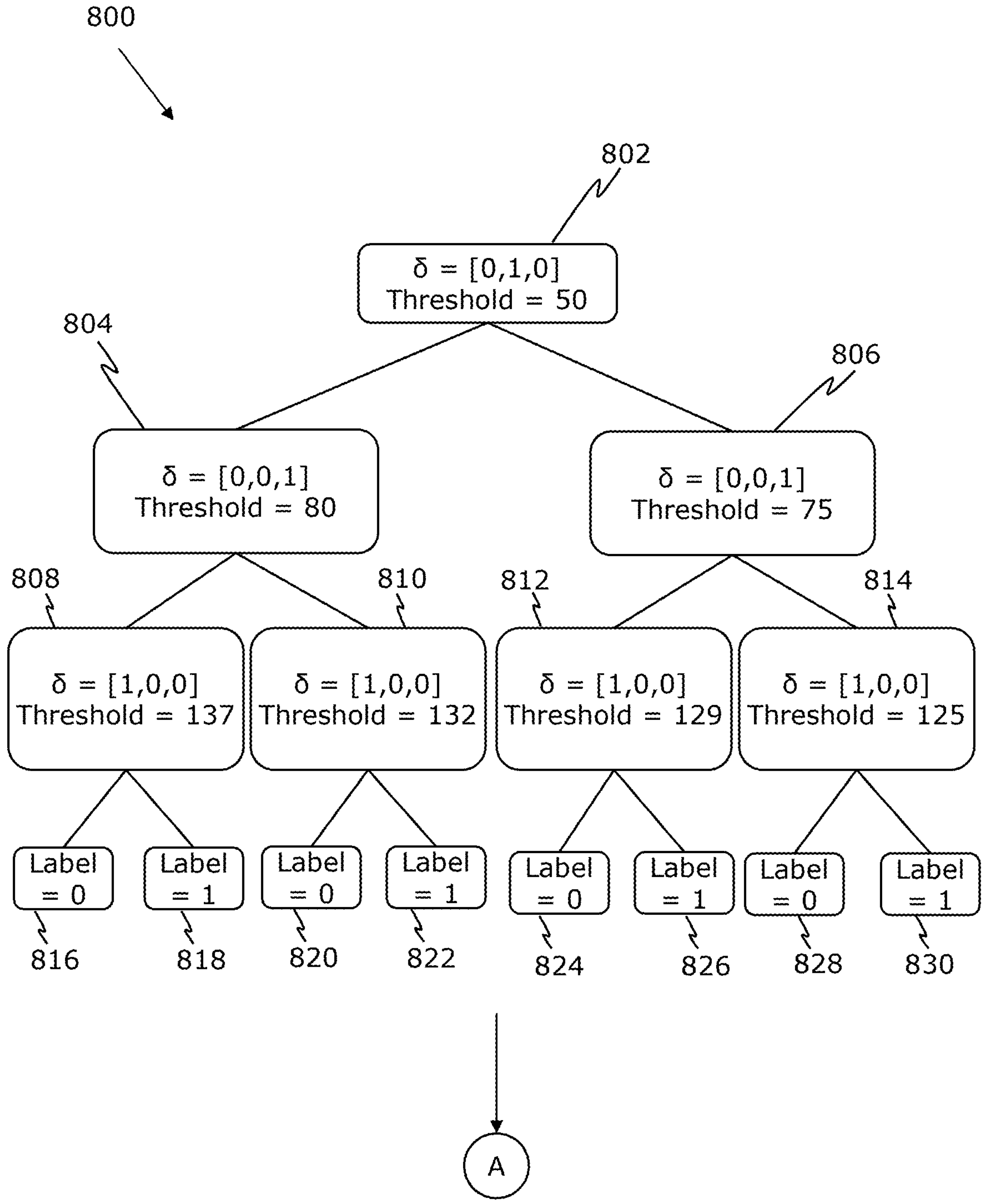

FIGS. 8A-8D illustrate an exemplary permuted decision tree classification model and its shares, in accordance with the second embodiment of the present disclosure. FIGS. 8A, 8B, 8C, and 8D are described in conjunction with elements from FIG. 1, FIG. 6, and FIG. 7. With reference to FIG. 8A and FIG. 8B, there is shown an exemplary permuted decision tree classification model, i.e., a permuted decision tree 800. An attribute sequence vector (V), i.e., a permuted sequence of attributes, is $[a_1, a_2, a_3]$, where $a_2$, a second attribute, is "Age", $a_3$, a third attribute, is "Weight", and $a_1$, a first attribute, is "Blood Pressure". The attribute sequence vector (V) is an outcome of a product of a permutation matrix (A) and a matrix including a sequence of attributes $[a_2, a_3, a_1]$. The permuted decision tree 800 is obtained from an original decision tree (not shown) based on the attribute sequence vector (V) (refer FIG. 3). Each non-leaf node of the permuted decision tree 800 is associated with an attribute and a threshold. As shown in FIG. 8A, the root node 802 (a non-leaf node) of the permuted decision tree 800 is associated with the second attribute "Age" and a threshold "50". First non-leaf nodes 804 and 806 signifying children of the root node 802 are associated with the third attribute "Weight". The first non-leaf node 804 is associated with a threshold "80". The first non-leaf node 806 is associated with a threshold "75". Second non-leaf nodes 808, 810, 812, and 814 signifying children of the first non-leaf nodes 804 and 806 are associated with the first attribute "Blood Pressure". The second non-leaf nodes 808, 810, 812, and 814, are associated with thresholds "137", "132", "129", and "125" respectively.

Furthermore, as shown in FIG. 8B, each non-leaf node of the permuted decision tree 800 is associated with an attribute targeting vector (δ). The root node 802 is associated with $a_2$, i.e., the second attribute "Age". The second attribute is in a second position in the sequence of attributes $[a_1, a_2, a_3]$. Hence, the attribute targeting vector (δ) associated with the root node 802 is [0, 1, 0]. The first nodes 804 and 806 are associated with $a_3$, i.e., the third attribute "Weight". The third attribute is in a third position in the sequence of attributes $[a_1, a_2, a_3]$. Hence, the attribute targeting vector (δ) associated with the first nodes 804 and 806 is [0, 0, 1]. The second nodes 808, 810, 812, and 814 are associated with $a_1$, i.e., the first attribute "Blood Pressure". The first attribute is in a first position in the sequence of attributes $[a_1, a_2, a_3]$. Hence, the attribute targeting vector (δ) associated with the second nodes 808, 810, 812, and 814 is [1, 0, 0].

Furthermore, as shown in FIGS. 8A and 8B, each leaf node (such as leaf node 816) of the permuted decision tree 800 is associated with a label which could be either "0" and "1". The labels are representative of classification results.

Figure 8C:
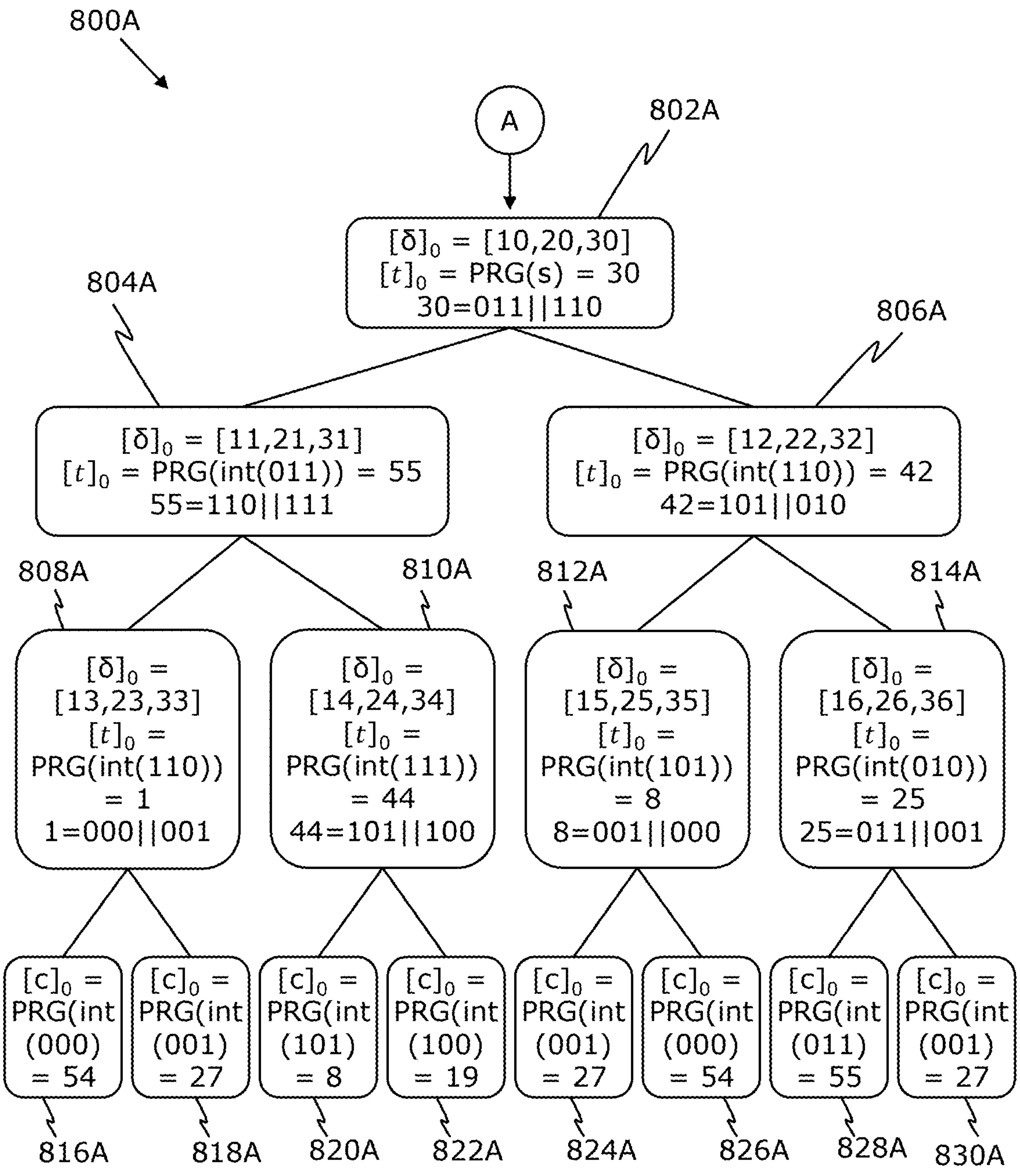
Figure 8D:
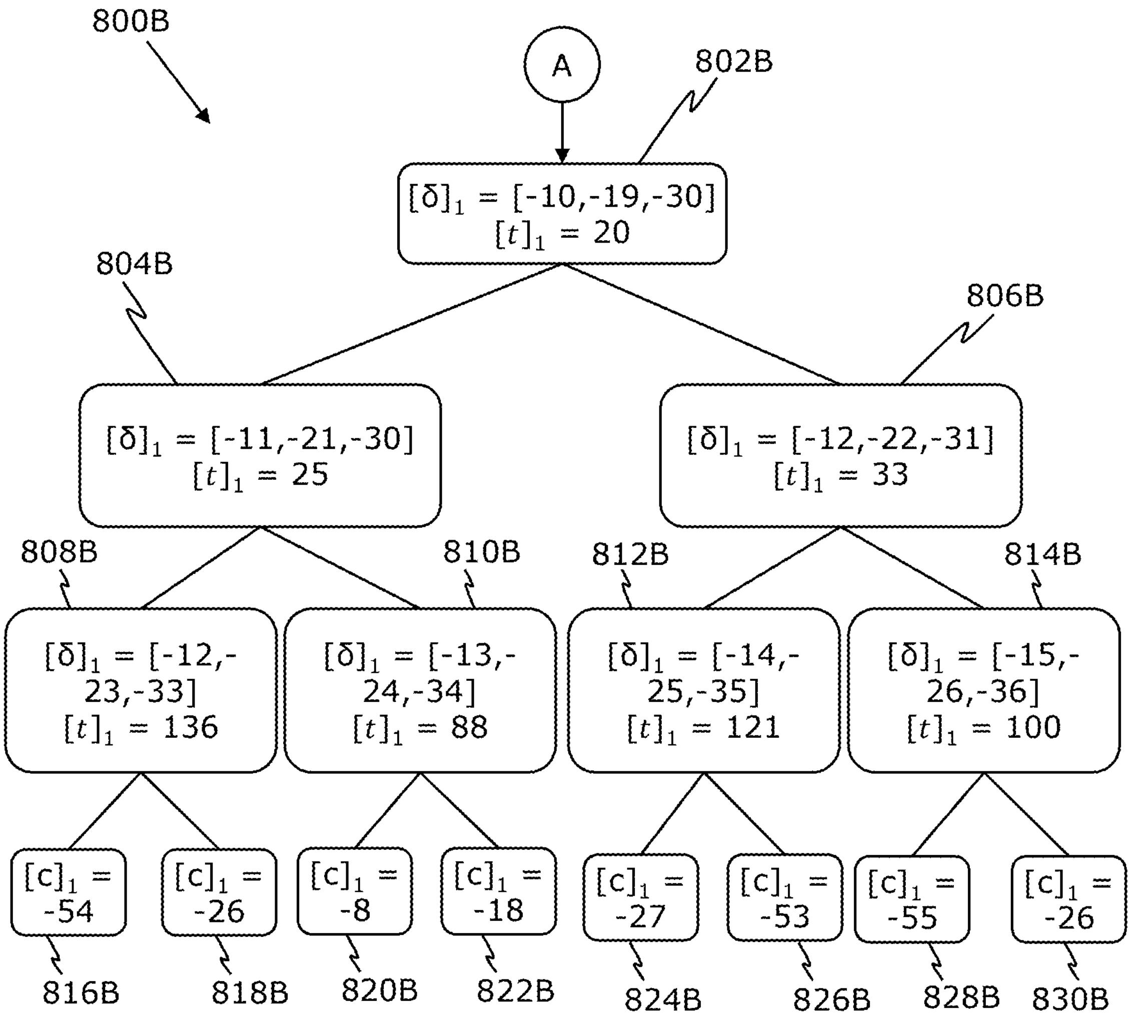

The permuted decision tree 800 is split into a first share of the permuted decision tree 800A (see FIG. 8C) and a second share of the permuted decision tree 800B (see FIG. 8D). The splitting is such that the threshold associated with each non-leaf node of the permuted decision tree 400 is split into a first share of threshold and a second share of threshold based on additive secret sharing. For example, the threshold "50" associated with the root node 802 of the permuted decision tree 800 is split into a first share of threshold "30" and a second share of threshold "20". The first share of threshold "30" is associated with a root node 802A of the first share of the permuted decision tree 800A whereas the second share of threshold "20" is associated with a corresponding root node 802B of the second share of the permuted decision tree 400B.

Furthermore, the label associated with each leaf node of the permuted decision tree 400 is split into a first label share and a second label share based on additive secret sharing. For example, a label "0" associated with the leaf node 816 of the permuted decision tree 800 is split into a first label share "54" and a second label share "−54". The first label share "54" is associated with a leaf node 816A of the first share of the permuted decision tree 800A whereas the second label share "−54" is associated with a corresponding leaf node 816B of the second share of the permuted decision tree 800B.

Furthermore, the attribute targeting vector (δ) associated with each non-leaf node of the permuted decision tree 800 is split into a first share of the attribute targeting vector $[\delta]_0$ and a second share of the attribute targeting vector $[\delta]_1$. For example, an attribute targeting vector (δ)=[0, 1, 0] associated with the root node 802 of the permuted decision tree 800 is split into a first share of the attribute targeting vector $[\delta]_0$=[10, 20, 30] and a second share of the attribute targeting vector $[\delta]_1$=[−10, −19, −30]. Herein, the first share of the attribute targeting vector $[\delta]_0$=[10, 20, 30] is associated with the root node 802A (i.e., a non-leaf node) of the first share of the permuted decision tree 800A and the second share of the attribute targeting vector $[\delta]_1$=[−10, −19, −30] is associated with the corresponding root node 802B (i.e., a non-leaf node) of the second share of the permuted decision tree 800B based on additive secret sharing. The splitting is such that an accumulation of each element (such as a first element "10") in the first share of the attribute targeting vector $[\delta]_0$=[10, 20, 30] and a corresponding element (such as a first element "−10") in the second share of the attribute targeting vector $[\delta]_1$=[−10, −19, −30] is equal to an element (such as a first element "0") of the attribute targeting vector (δ)=[0, 1, 0].

The third device 106 transmits the first share of the attribute targeting vector $[\delta]_0$, obtained by splitting the attribute targeting vector (δ) associated with each non-leaf node of the permuted decision tree 800, to the first device 102. The third device 106 further transmits the second share of the attribute targeting vector $[\delta]_1$, obtained by splitting the attribute targeting vector (δ) associated with each non-leaf node of the permuted decision tree 800, to the second device 104. Thus, each non-leaf node of the first share of the permuted decision tree 800A is associated with a first share of the attribute targeting vector $[\delta]_0$ (as shown in FIG. 8C). Furthermore, each corresponding non-leaf node of the second share of the permuted decision tree 800B is associated with a second share of the attribute targeting vector $[\delta]_1$ (as shown in FIG. 8D).

An original query data (x) constituting a sequence of attribute values is [x(0), x(1), x(2)]. Here "x(0)" is an attribute value of the first attribute "Blood Pressure", "x(1)" is an attribute value of the second attribute "Age", and "x(2)" is an attribute value of the third attribute "Weight". A permuted query data (x') obtained after altering the sequence of attribute values based on the attribute sequence vector (V) is [x(1), x(2), x(0)]". The first device 102 generates two shares of the permuted query data (x'). A first share of the permuted query data $[x']_0$ is stored in the first device 102. Here, $[x']_0=[\{x_{(Age)}\}_0, \{x_{(Weight)}\}_0, \{x_{(Blood\ Pressure)}\}_0]^T$. Furthermore, the first device 102 transmits a first seed ($s_q$) to the second device 104 to enable the second device 104 to generate a second share of the permuted query data "$[x']_1$" using the first seed. Here, $[x']_1=[\{x_{(Age)}\}_1, \{x_{(Weight)}\}_1, \{x_{(Blood\ Pressure)}\}_1]^T$.

The first device 102 computes a first share of a dot product $[x_{Age}]_0$ associated with the root node 802A of the first share of the permuted decision tree 800A based on the first share of the attribute-targeting vector $[\delta]_0$ associated with the root node 802A, the first share of the permuted query data $[x']_0$, a masked version of the second share of the attribute-targeting vector associated with the root node 802B, a masked version of the second share of the permuted query data, a first share of a second beaver triple $[q]_0$, and a first share of a third beaver triple $[r]_0$. The masked version of the second share of the attribute-targeting vector associated with the root node 802B and the masked version of the second share of the permuted query data are received from the second device 104. The second device 104 masks the second share of the attribute-targeting vector $[\delta]_1$ associated with the root node 802B using a second share of a first beaver triple $[p]_1$ and transmits the masked version of the second share of the attribute-targeting vector to the first device 102. The second device 104 further masks the second share of the permuted query data $[x']_1$ using a second share of the second beaver triple $[q]_1$ and transmits the masked version of the second share of the permuted query data to the first device 102.

The second device 104 computes a second share of the dot product $[x_{Age}]_1$ associated with the root node 802B of the second share of the permuted decision tree 800B based on the second share of the attribute-targeting vector $[\delta]_1$ associated with the root node 802B, the second share of the permuted query data $[x']_1$, a masked version of the first share of the attribute-targeting vector associated with the root node 802A, a masked version of the first share of the permuted query data, a second share of the second beaver triple $[q]_1$, and a second share of the third beaver triple $[r]_1$. The masked version of the first share of the attribute-targeting vector associated with the root node 802A and the masked version of the first share of the permuted query data are received from the first device 102. The first device 102 masks the first share of the attribute-targeting vector $[\delta]_0$ associated with the root node 802A using a first share of the first beaver triple $[p]_0$ and transmits the masked version of the first share of the attribute-targeting vector to the second device 104. The first device 102 further masks the first share of the permuted query data $[x']_0$ using a first share of the second beaver triple $[q]_0$ and transmits the masked version of the first share of the permuted query data to the second device 104.

The first device 102 uses the second seed (s), received from the third device 106, to compute a first share of the threshold $[t]_0$ associated with the root node 802A of the first share of the permuted decision tree 800A. The first share of the threshold $[t]_0$ is computed by applying a Pseudo Random Generator (PRNG) on the second seed (s). An outcome of the PRNG application is the first share of the threshold associated with the root node 402A (i.e., 30). It may be noted that the first device 102 is required to compute the first share of the threshold associated with the root node 802A as the third device 106 does not transmit the first share of the permuted decision tree 800A to the first device 102. On the other hand, the third device 106 transmits the second share of the permuted decision tree 800B to the second device 104. Therefore, a second share of the threshold (i.e., 20) associated with the corresponding root node 802B of the second share of the permuted decision tree 800B is stored in the second device 104.

Thereafter, the second device 104 performs a first secure comparison operation. For the first secure comparison operation, the first device 102 transmits, to the second device 104, a masked version of the first share of the threshold (for example, $30+[\alpha]_0$) associated with the root node 802A and a masked version of the first share of the dot product ($[x_{Age}]_0+[\alpha]_0$) associated with the root node 802A of the first share of the permuted decision tree 800A. The masked version of the first share of the threshold ($30+[\alpha]_0$) associated with the root node 802A and the masked version of first share of the dot product ($[x_{Age}]_0+[\alpha]_0$) associated with the root node 802A are obtained based on a first share $[\alpha]_0$ of a mask variable (α).

The second device 104 performs the first secure comparison operation by comparing an accumulation of the masked version of the first share of the threshold ($30+[\alpha]_0$) associated with the root node 802A and a masked version of the second share of the threshold (for example, $20+[\alpha]_1$) associated with the corresponding root node 802B with an accumulation of the masked version of the first share of the dot product ($[x_{Age}]_0+[\alpha]_0$) associated with the root node 802A and a masked version of the second share of the dot product (for example, $[x_{Age}]_1+[\alpha]_1$) associated with the corresponding root node 802B. The masked version of the second share of the threshold ($20+[\alpha]_1$) associated with the corresponding root node 802B and the masked version of the second share of the dot product ($[x_{Age}]_1+[\alpha]_1$) associated with the corresponding root node 802B are obtained based on a second share $[\alpha]_1$ of the mask variable ($\alpha$).

The first secure comparison operation generates an outcome. Based on the outcome, the second device 104 selects a corresponding first non-leaf node 806B, which is a child node of the corresponding root node 802B. The second device 104 transmits the outcome of the first secure comparison operation to the first device 102. Based on the received outcome, the first device 102 selects a first non-leaf node 806A, which is the child node of the root node 802A. This is because of a placement of the first non-leaf node 806A in the first share of the permuted decision tree 800A and a placement of the corresponding first non-leaf node 806B in the second share of the permuted decision tree 800B. Furthermore, the first device 102 determines a portion of the first share of the threshold $[t]_0$ associated with the root node 802A based on the outcome of the first secure comparison operation. The first share of the threshold associated with the root node 802A is "30", which is "011110" in binary. Based on the outcome the first secure comparison operation, i.e., selection of the first non-leaf node 806A, the determined portion of the first share of the threshold associated with the root node 402A is "110".

After the selection of the first non-leaf node 806A, the first device 102 computes a first share of a threshold associated with the first non-leaf node 806A, which is a child node of the root node 802A, by applying the PRNG on the determined portion (i.e., 110) of the first share of the threshold (i.e., 011110) associated with the root node 802A. The outcome of the PRNG application is "42", i.e., "101010" in binary. Thus, the first share of the threshold associated with the first non-leaf node 806A is "42". A second share of the threshold (i.e., 33) associated with the corresponding first non-leaf node 806B of the second share of the permuted decision tree 800B is stored in the second device 104. The corresponding first non-leaf node 806B is a child node of the corresponding root node 802B.

The first device 102 computes a first share of a dot product $[x_{Weight}]_0$ associated with the first non-leaf node 806A. The second device 104 computes a second share of the dot product $[x_{Weight}]_1$ associated with the corresponding first non-leaf node 806B. Thereafter, the second device 104 performs a second secure comparison operation based on masked versions of the first share of the threshold (i.e., 42) associated with the first non-leaf node 806A, the second share of the threshold (i.e., 33) associated with the corresponding first non-leaf node 806B, $[x_{Weight}]_0$, and $[x_{Weight}]_1$. Based on an outcome of the second secure comparison operation, a corresponding second non-leaf node 814B, which is a child node of the corresponding first non-leaf node 806B, is selected. The second device 104 transmits the outcome of the second secure comparison operation to the first device 102. Based on the received outcome, the first device 102 selects a second non-leaf node 814A, which is the child node of the first non-leaf node 806A. The first device 102 determines a portion of the first share of the threshold associated with the first non-leaf node 806A based on the outcome of the second secure comparison operation. The determined portion is "010".

The first device 102 further computes a first share of a threshold associated with the second non-leaf node 814A by applying the PRNG on the portion (i.e., 010) of a first share of a threshold associated with a parent node of the second non-leaf node 814A. The parent node is the first non-leaf node 806A and the first share of the threshold associated with the parent node is "42". The second non-leaf node 814A is a parent node of a pair of leaf nodes (for example, 828A and 830A) of the first share of the permuted decision tree 800A. The outcome of the PRNG application is the first share of the threshold (i.e., 25) associated with the second non-leaf node 814A. A second share of the threshold (i.e., 100) that is associated with the corresponding second non-leaf node 814B of the second share of the permuted decision tree 800B is stored in the second device 104. The corresponding second non-leaf node 814B is a parent of a corresponding pair of leaf nodes (for example, leaf nodes 828B and 830B).

The first device 102 computes a first share of a dot product $[x_{Blood\ Pressure}]_0$ associated with the second non-leaf node 814A of the first share of the permuted decision tree 800A. The second device 104 computes a second share of the dot product $[x_{Blood\ Pressure}]_1$ associated with the corresponding second non-leaf node 814B of the second share of the permuted decision tree 800B. Thereafter, the second device 104 performs a final secure comparison operation.

For the final secure comparison operation, the first device 102 transmits, to the second device 104, a masked version of the first share of the threshold (for example, $25+[\alpha]_0$) associated with the second non-leaf node 814A and a masked version of the first share of the dot product associated with the second non-leaf node 814A of the first share of the permuted decision tree 800A. The masked version of the first share of the threshold ($25+[\alpha]_0$) associated with the second non-leaf node 814A and the masked version of the first share of the dot product associated with the second non-leaf node 814A are obtained based on the first share $[\alpha]_0$ of the mask variable ($\alpha$).

The second device 104 performs the final secure comparison operation by comparing an accumulation of a masked version of the first share of the threshold ($25+[\alpha]_0$) associated with the second non-leaf node 814A and a masked version of the second share of the threshold ($100+[\alpha]_1$) associated with the corresponding second non-leaf node 814B with an accumulation of the masked version of the first share of the dot product ($[x_{Blood\ Pressure}]_0+[\alpha]_0$) associated with the second non-leaf node 814A and a masked version of the second share of the dot product ($[x_{Blood\ Pressure}]_1+[\alpha]_1$) associated with the corresponding second non-leaf node 814B of the second share of the permuted decision tree 800B. The masked version of the second share of the threshold ($100+[\alpha]_1$) associated with the corresponding second non-leaf node 814B and the masked version of the second share of the dot product ($[x_{Blood\ Pressure}]_1+[\alpha]_1$) associated with the corresponding second non-leaf node 814B are obtained based on a second share $[\alpha]_1$ of the mask variable ($\alpha$).

The final secure comparison operation generates an outcome. Based on the outcome, the second device 104 selects a corresponding leaf node 830B, which is the child node of the corresponding second non-leaf node 814B. Thereafter, the second device 104 generates a second share of the classification result $[c]_1$ based on a label (−26) associated with the corresponding leaf node 830B. The label (−26) is stored in the corresponding leaf node 830B. The second device 104 transmits the outcome of the final secure comparison operation and the second share of the classification result $[c]_1$ to the first device 102. Based on the received outcome, the first device 102 determines a leaf node 830A, which is the child node of the second non-leaf node 814A. This is because of a placement of the leaf node 830A in the first share of the permuted decision tree 800A and a placement of the corresponding leaf node 830B in the second share of the permuted decision tree 800B.

Furthermore, the first device 102 determines a first share of the classification result $[c]_0$ by applying the PRNG on a portion of the first share of the threshold associated with the second non-leaf node 814A. An outcome of the application of the PRNG is a label associated with the leaf node 830A. The first share of the threshold associated with the second non-leaf node 814A is "25", which is "011001" in binary. Based on the outcome the final secure comparison operation, i.e., selection of the leaf node 830A, the determined portion of the first share of the threshold associated with the second non-leaf node 814A is "001". The first device 102 computes the label by applying the PRNG on the (determined) portion (i.e., "001") of the first share of the threshold (i.e., "011001") associated with the second non-leaf node 814A. The outcome of the PRNG application is "27". The first device 104 generates the first share of the classification result $[c]_0$ based on the label (i.e., 27) associated with the leaf node stored 830A. Thereafter, the first device generates a decision tree classification result (1) based on the first share of the classification result $[c]_0$ and the second share of the classification result $[c]_1$.

It may be noted that a set of non-leaf nodes that form a path from the root node 802A to the leaf node 830A in the first share of the permuted decision tree 800A include the root node 802A, the first non-leaf node 806A, and the second non-leaf node 814A. The first share of the classification result $[c]_0$ is obtained by traversing the path. The path initially includes only the root node 802A and is incrementally formed based on outcomes of three secure comparison operations. The first share of the dot product associated each of the root node 802A, the first non-leaf node 806A, and the second non-leaf node 814A are computed by the first device 102. On the other hand, a set of corresponding non-leaf nodes forming a corresponding path from the corresponding root node 802B to the corresponding leaf node 830B in the second share of the permuted decision tree 800B include the corresponding root node 802B, the corresponding first non-leaf node 806B, and the corresponding second non-leaf node 814B. The second share of the classification result $[c]_1$ is obtained by traversing the corresponding path. The corresponding path initially includes only the corresponding root node 802B and is incrementally formed based on outcomes of three secure comparison operations. The second share of the dot product associated each of the corresponding root node 802B, the corresponding first non-leaf node 806B, and the corresponding second non-leaf node 814B are computed by the second device 104.

Figure 9A:
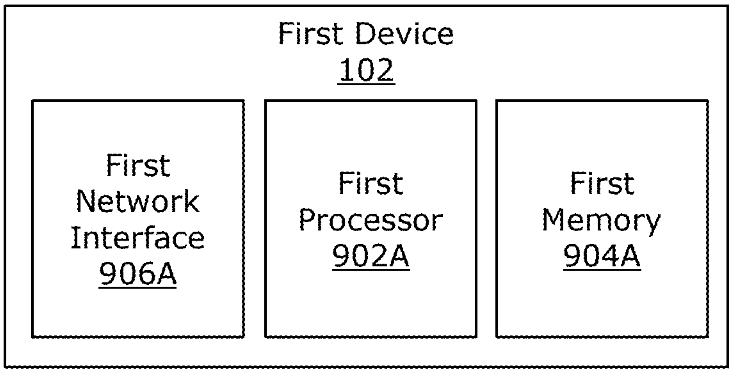
FIGS. 9A-9C are block diagrams illustrating components of the entities in the exemplary networking environment, in accordance with the second embodiment of the present disclosure.
Figure 9B:
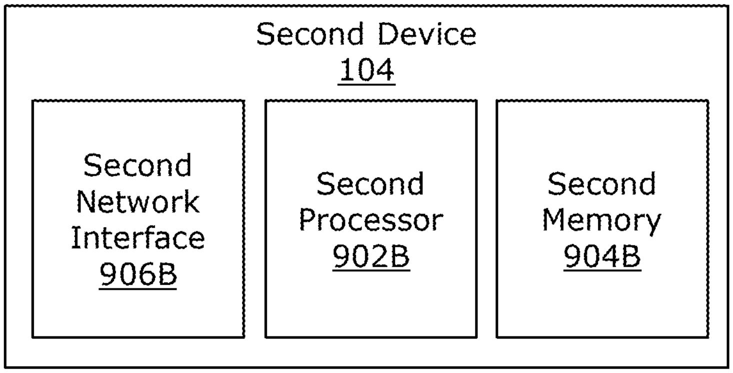
Figure 9C:
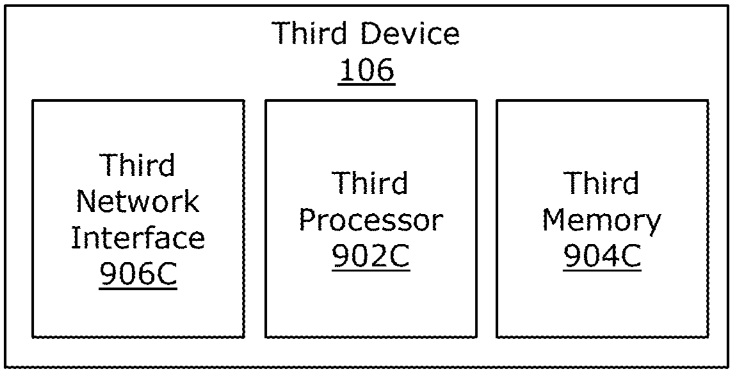

FIGS. 9A-9C are block diagrams illustrating components of the entities in the exemplary networking environment 100, in accordance with the second embodiment of the present disclosure. FIGS. 9A-9C are described in conjunction with elements from FIG. 1, FIG. 6, FIG. 7, and FIGS. 8A-8D. With reference to FIG. 9A, there is shown the first device 102. The first device 102 includes a first processor 902A, a first memory 904A, and a first network interface 906A. The first memory 904A stores the original query data (x), the permuted query data (x'), a first share of the permuted query data $[x']_0$, a second share of the permuted query data $[x']_1$, the first seed ($s_q$), the second seed (s) (received from the third device 106), the first share of the attribute-targeting vector $[\delta]_0$ associated with each non-leaf node of the first share of a permuted decision tree, the first shares of the dot products $[x_{a*}]_0$ (of attribute-targeting vectors (δ) and the permuted query data (x')) associated with the set of non-leaf nodes of the first share of the permuted decision tree, the first shares of the thresholds associated with the set of non-leaf nodes of the first share of the decision tree, masked versions of the first shares of the thresholds, the masked versions of the first share of the dot products, outcomes of the secure comparison operations (received from the second device 104), the first share of the classification result, the second share of the classification result (received from the second device 104), and the decision tree classification result.

In an embodiment, the first processor 902A is configured to perform a set of operations that enable generation of the first share of the classification result, the second share of a classification result, and the decision tree classification result.

The first processor 902A refers to a computational element that is operable to respond to and processes instructions that drive the first device 102. The first processor 902A may refer to one or more individual processors, processing devices, and various elements associated with a processing device that may be shared by other processing devices. Additionally, the one or more individual processors, the processing devices, and the various elements are arranged in various architectures for responding to and processing the instructions that drive the first device 102. In some implementations, the first processor 902A may be an independent unit.

Examples of the first processor 902A may include, but are not limited to, a hardware processor, a microprocessor, a microcontroller, a DSP, a CISC processor, an ASIC processor, a VLIW processor, a RISC processor, a data processing unit, a GPU, a state machine, and other processors or control circuitry.

The first memory 904A refers to a volatile or persistent medium, such as an electrical circuit, a magnetic disk, a virtual memory, or an optical disk, in which a computer stores data or software for any duration. Optionally, the first memory 904A is a non-volatile mass storage, such as a physical storage media. Examples of implementation of the first memory 904A may include, but are not limited to, an EEPROM, a DRAM, a RAM, a ROM, a HDD, a Flash memory, an SD card, an SSD, and/or a CPU cache memory.

The first network interface 906A refers to a communication interface to enable the first device 102 to communicate with the second device 104 and the third device 106. Examples of the first network interface 906A include, but are not limited to, a network interface card, a transceiver, and the like.

With reference to FIG. 9B, there is shown the second device 104. The second device 104 includes a second processor 902B, a second memory 904B, and a second network interface 906B. The second memory 904B stores a first seed ($s_q$) from the first device 102, the second share of the permuted decision tree $[M']_1$ (received from the third device 106), the second share of an attribute-targeting vector $[\delta]_1$ associated with each corresponding non-leaf node of the second share of the permuted decision tree, the second share of the permuted query data $[x']_1$, second shares of the dot products $[x_{a*}]_1$ (of attribute-targeting vectors (δ) and the permuted query data (x')) that are associated with the set of corresponding non-leaf nodes of the second share of the permuted decision tree, masked versions of the first shares of the thresholds associated with set of the non-leaf nodes of the first share of the decision tree (received from the first device 102), the masked versions of the first shares of the dot products that are associated with the set of non-leaf nodes of the first share of the permuted decision tree (received from the first device 102), second shares of the thresholds associated with the set of corresponding non-leaf nodes of the second share of the decision tree, masked versions of the second shares of the thresholds, the masked versions of the second shares of the dot products, outcomes of the secure comparison operations, outcomes of the secure comparison operations, and the second share of the classification result.

In an embodiment, the second processor 902B is configured to perform a set of operations that enable the generation of the first share of the classification result, the second share of a classification result, and the decision tree classification result.

The second processor 902B refers to a computational element that is operable to respond to and processes instructions that drive the second device 104. The second processor 902B may refer to one or more individual processors, processing devices, and various elements associated with a processing device that may be shared by other processing devices. Additionally, the one or more individual processors, the processing devices, and the various elements are arranged in various architectures for responding to and processing the instructions that drive the second device 104. In some implementations, the second processor 902B may be an independent unit.

Examples of the second processor 902B may include, but are not limited to, a hardware processor, a microprocessor, a microcontroller, a DSP, a CISC processor, an ASIC processor, a VLIW processor, a RISC processor, a data processing unit, a GPU, a state machine, and other processors or control circuitry.

The second memory 904B refers to a volatile or persistent medium, such as an electrical circuit, a magnetic disk, a virtual memory, or an optical disk, in which a computer can store data or software for any duration. Optionally, the second memory 904B is a non-volatile mass storage, such as a physical storage media. Examples of implementation of the second memory 904B include, but are not limited to, an EEPROM, a DRAM, a RAM, a ROM, a HDD, a Flash memory, an SD card, an SSD, and/or a CPU cache memory.

The second network interface 906B refers to a communication interface to enable the second device 104 to communicate with the first device 102 and the third device 106. Examples of the second network interface 906B include, but are not limited to, a network interface card, a transceiver, and the like.

With reference to FIG. 9C, there is shown the third device 106. The third device 106 includes a third processor 902C, a third memory 904C, and a third network interface 906C. The third memory 904C stores the attribute sequence vector, the permuted decision tree, the first share of the permuted decision tree, the second share of the permuted decision tree, an attribute associated with each non-leaf node of the permuted decision tree, an attribute-targeting vector and a threshold associated with each non-leaf node of the permuted decision tree, a first share of the attribute-targeting vector and a first share of the threshold associated with each non-leaf node in the first share of the permuted decision tree, a second share of the attribute-targeting vector and a second share of the threshold associated with each corresponding non-leaf node in the second share of the permuted decision tree, and the second seed.

In an embodiment, the third processor 902C is configured to perform a set of operations that enable the generation of the first share of the classification result, the second share of the classification result, and the decision tree classification result.

The third processor 902C refers to a computational element that is operable to respond to and processes instructions that drive the third device 106. The third processor 902C may refer to one or more individual processors, processing devices, and various elements associated with a processing device that may be shared by other processing devices. Additionally, the one or more individual processors, the processing devices, and the various elements are arranged in various architectures for responding to and processing the instructions that drive the third device 106. In some implementations, the third processor 902C may be an independent unit.

Examples of the third processor 902C may include, but are not limited to a hardware processor, a microprocessor, a microcontroller, a DSP, a CISC processor, an ASIC processor, a VLIW processor, a RISC processor, a data processing unit, a GPU, a state machine, and other processors or control circuitry.

The third memory 904C refers to a volatile or persistent medium, such as an electrical circuit, a magnetic disk, a virtual memory, or an optical disk, in which a computer can store data or software for any duration. Optionally, the third memory 904C is a non-volatile mass storage, such as a physical storage media. Examples of implementation of the third memory 904C include, but are not limited to, an EEPROM, a DRAM, a RAM, a ROM, a HDD, a Flash memory, a SD card, a SSD, and/or a CPU cache memory.

The third network interface 906C refers to a communication interface to enable the third device 106 to communicate with the first device 102 and the second device 104. Examples of the third network interface 906C include, but are not limited to, a network interface card, a transceiver, and the like.

Modifications to embodiments of the present disclosure described in the foregoing are possible without departing from the scope of the present disclosure as defined by the accompanying claims. Expressions such as "including", "comprising", "incorporating", "have", "is", etc., used to describe and claim the present disclosure are intended to be construed in a non-exclusive manner, namely allowing for items, components or elements not explicitly described also to be present. Reference to the singular is also to be construed to relate to the plural. The word (exemplary( is used herein to mean (serving as an example, instance or illustration(. Any embodiment described as (exemplary( is not necessarily to be construed as preferred or advantageous over other embodiments and/or to exclude the incorporation of features from other embodiments. The word (optionally( is used herein to mean (is provided in some embodiments and not provided in other embodiments). It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the disclosure.

What is claimed is:

1. A system comprising a first device and a second device, wherein the first device comprising a first processor, the first processor configured to:

generate a hash vector comprising hash values of all attribute fields whose values are included in a query data;

execute, iteratively, a set of steps for traversing a decision tree until a leaf node is encountered, wherein the set of steps comprises:

permute each of the query data and the hash vector randomly to generate a permuted query data and a permuted hash vector, transmit a masked version of the permuted hash vector and masked versions of a first share of a hash value of an attribute field associated with a non-leaf node of a first share of the decision tree to the second device, receive a first share of an attribute-targeting vector associated with the non-leaf node from the second device, wherein generation of the first share of the attribute-targeting vector associated with the non-leaf node is based on the masked version of the permuted hash vector and the masked versions of the first share of the hash value of the attribute field, transmit a second share of the permuted query data to the second device, wherein a first share of the permuted query data and the second share of the permuted query data are generated based on application of an additive secret sharing function on the permuted query data, compute a first share of a dot product of the attribute-targeting vector and the permuted query data based on the first share of the attribute-targeting vector associated with the non-leaf node and the first share of the permuted query data, wherein the second device computes a second share of the dot product based on a second share of the attribute-targeting vector associated with a corresponding non-leaf node of a second share of the decision tree and the second share of the permuted query data, receive, from the second device, an outcome of a secure comparison operation performed based on masked versions of each of the first share of the dot product, a first share of a threshold associated with the non-leaf node, the second share of the dot product, and a second share of the threshold associated with the corresponding non-leaf node, wherein, at a first iteration, the non-leaf node is a root node of the first share of the decision tree and the corresponding non-leaf node is a root node of the second share of the decision tree, and select a first child node of the non-leaf node based on the outcome of the secure comparison operation, wherein a second child node of the corresponding non-leaf node is selected based on the outcome of the secure comparison operation, wherein, at a subsequent iteration, the first child node is the non-leaf node of the first share of the decision tree and the second child node is the corresponding non-leaf node of the second share of the decision tree, wherein the first child node is a first leaf node of the first share of the decision tree selected at a final iteration, and wherein the second child node is a corresponding second leaf node of the second share of the decision tree selected at the final iteration;

generate a first share of a classification result based on a label associated with the first leaf node;

receive, from the second device, a second share classification result generated based on a label associated with the corresponding second leaf node stored in the corresponding second leaf node; and generate a decision tree classification result based on the first share of the classification result and the second share of the classification result, wherein the first processor is further configured to:

generate the masked version of the permuted hash vector by masking each element of the permuted hash vector by a unique mask variable; and generate masked versions of the first share of the hash value of the attribute field associated with the non-leaf node of the first share of the decision tree using the unique mask variable, wherein, upon reception of the masked version of the permuted hash vector and the masked versions of the first share of the hash value of the attribute field associated with the non-leaf node of the first share of the decision tree, the second device is configured to:

generate the attribute-targeting vector based on the masked version of the permuted hash vector, the masked versions of the first share of the hash value of the attribute field associated with the non-leaf node of the first share of the decision tree, and a second share of the hash value of the attribute field associated with the corresponding non-leaf node of the second share of the decision tree, apply the additive secret sharing function on the attribute-targeting vector for generation of the first share of the attribute-targeting vector associated with the non-leaf node and the second share of the attribute-targeting vector associated with the corresponding non-leaf node, wherein an accumulation of the first share of the attribute-targeting vector associated with the non-leaf node and the second share of the attribute-targeting vector associated with the corresponding non-leaf node results in the attribute-targeting vector, and transmit the first share of the attribute-targeting vector associated with the non-leaf node to the first device, and wherein the first processor is further configured to compute a first share of a threshold associated with the root node of the first share of the decision tree and a first share of the hash value of an attribute field associated with the root node of the first share of the decision tree by applying a pseudo-random generator (PRNG) on a seed, wherein the seed is received from a third device, wherein a second share of the threshold associated with the root node of the second share of the decision tree and a second share of the hash value of the attribute field associated with the root node of the second share of the decision tree is stored in the second device.

2. The system according to claim 1, wherein the first processor is further configured to:

apply a hash function on each attribute field whose value is included in the query data;

obtain a hash value of each attribute field based on the application of the hash function on each attribute field, wherein the hash vector comprises the hash values of all the attribute fields.

3. The system according to claim 1, wherein the first processor is further configured to randomly alter a sequence of the values of the attribute fields constituting the query data, wherein the permuted query data is generated based on the alteration.

4. The system according to claim 1, wherein the first processor is further configured to randomly alter a sequence of the hash values of all attribute fields constituting the hash vector, wherein the permuted hash vector is generated based on the alteration.

5. The system according to claim 1, wherein the first processor is further configured to apply the additive secret sharing function on the permuted query data such that the first share of the permuted query data and the second share of the permuted query data are generated based on the application, wherein an accumulation of the first share of the permuted query data and the second share of the permuted query data results in the permuted query data.

6. The system according to claim 5, wherein an accumulation of an element of the first share of the permuted query data and a corresponding element of the second share of the permuted query data results in an element of the permuted query data.

7. The system according to claim 1, wherein the first processor is further configured to:

mask the first share of the attribute-targeting vector by use of a first share of a first beaver triple to generate a masked version of the first share of the attribute-targeting vector;

mask the first share of the permuted query data by use of a first share of a second beaver triple to generate a masked version of the first share of the permuted query data;

transmit the masked version of the first share of the attribute-targeting vector and the masked version of the first share of the permuted query data to the second device;

receive a first share of a third beaver triple, a masked version of the second share of the attribute-targeting vector, and a masked version of the second share of the permuted query data, wherein the second device masks the second share of the attribute-targeting vector by use of a second share of the first beaver triple and masks the second share of the permuted query data by use of a second share of the second beaver triple;

compute the first share of the dot product based on the first share of the attribute-targeting vector, the first share of the permuted query data, the masked version of the second share of the attribute-targeting vector, the masked version of the second share of the permuted query data, the first share of the second beaver triple, and the first share of the third beaver triple, wherein the second device receives a second share of the third beaver triple, the masked version of the first share of the attribute-targeting vector and the masked version of the first share of the permuted query data, and computes the second share of the dot product based on the second share of the attribute-targeting vector, the second share of the permuted query data, the masked version of the first share of the attribute-targeting vector, the masked version of the first share of the permuted query data, the first share of the second beaver triple, and the second share of the third beaver triple, wherein the first share of the third beaver triple is generated based on the first share of the first beaver triple, the second share of the second beaver triple, and a constant, and wherein the second share of the third beaver triple is generated based on the second share of the first beaver triple, the first share of the second beaver triple, and the constant.

8. The system according to claim 1, wherein the first processor is further configured to compute a first share of a threshold associated with the first child node and a first share of a hash value of an attribute field associated with the first child node by applying the PRNG on a portion of the first share of the threshold associated with the root node of the first share of the decision tree, wherein the portion of the first share of the threshold associated with the root node is selected based on the outcome of the secure comparison operation obtained at the first iteration, and wherein the outcome involves selection of the first child node, wherein a second share of the threshold associated with the second child node of the root node of the second share of the decision tree and a second share of the hash value of the attribute field associated with the second child node of the root node of the second share of the decision tree is stored in the second device.

9. The system according to claim 1, wherein the first processor is further configured to compute the label associated with the first leaf node by applying the PRNG on a portion of the first share of the threshold associated with the non-leaf node of the first share of the decision tree, wherein the non-leaf node is a parent node of the first leaf node, wherein the portion of the first share of the threshold associated with the parent node of the first leaf node is selected based on an outcome of the secure comparison operation obtained at the final iteration, and wherein the outcome involves selection of the first leaf node.

10. The system according to claim 1, wherein the first processor is further configured to:

transmit, to the second device, the masked version of the first share of the dot product and the masked version of the first share of the threshold associated with the non-leaf node, wherein the masked version of the first share of the dot product and the masked version of the first share of the threshold associated with the non-leaf node are obtained based on a first share of a mask variable, wherein the secure comparison operation is performed by comparing an accumulation of the masked version of the first share of the dot product and the masked version of the second share of the dot product with an accumulation of the masked version of the first share of the threshold associated with the non-leaf node and the masked version of the second share of the threshold associated with the corresponding non-leaf node, wherein the masked version of the second share of the dot product and the masked version of the second share of the threshold associated with the corresponding non-leaf node is obtained based on a second share of the mask variable, and wherein the second device selects the second child node of the corresponding non-leaf node based on the outcome of the secure comparison operation;

receive the outcome of the secure comparison operation from the second device; and select the first child node of the non-leaf node based on the outcome of the secure comparison operation.

11. The system according to claim 1, wherein the first processor is further configured to:

obtain a second permuted query data from a second query data comprising a sequence of attribute values, wherein the sequence of attribute values is altered based on a permutation matrix to generate the second permuted query data;

generate two shares of the second permuted query data, wherein a first share of the second permuted query data is stored in the first device;

transmit a first seed to the second device to enable the second device to generate a second share of the second permuted query data using the first seed;

receive, from the third device, a first share of an attribute-targeting vector associated with each non-leaf node of a first share of a permuted decision tree, wherein the second device receives, from the third device, a second share of the attribute-targeting vector associated with each corresponding non-leaf node of a second share of the permuted decision tree;

compute first shares of dot products associated with a set of non-leaf nodes of the first share of the permuted decision tree based on first shares of attribute-targeting vectors associated with the set of non-leaf nodes of the permuted decision tree and the first share of the second permuted query data, wherein the second device computes second shares of the dot products associated with a set of corresponding non-leaf nodes of the second share of the permuted decision tree based on second shares of the attribute-targeting vectors associated with the set of corresponding non-leaf nodes of the permuted decision tree and the second share of the second permuted query data;

receive a second seed received from the third device, wherein the second seed is used to compute first shares of thresholds associated with the set of non-leaf nodes of the first share of the permuted decision tree, and wherein second shares of the thresholds associated with the set of corresponding non-leaf nodes of the second share of the permuted decision tree are received by the second device from the third device;

receive a second share of a second classification result and outcomes of second secure comparison operations from the second device, wherein the second share of the second classification result is generated based on the outcomes of the second secure comparison operations, wherein the second secure comparison operations are performed based on masked versions of each of the first shares of the thresholds associated with the set of non-leaf nodes of the permuted decision tree, the first shares of the dot products associated with the set of non-leaf nodes of the permuted decision tree, the second shares of the thresholds associated with the set of corresponding non-leaf nodes of the permuted decision tree, and the second shares of the dot products associated with the set of corresponding non-leaf nodes of the permuted decision tree;

generate a first share of the second classification result based on the outcomes of the second secure comparison operations; and —generate a decision tree classification result based on the first share of the second classification result and the second share of the second classification result.

12. The system according to claim 11, wherein the first processor is further configured to:

receive an attribute sequence vector from the third device, wherein the attribute sequence vector is a permuted sequence of attributes, wherein the attribute sequence vector is an outcome of a product of the permutation matrix and a matrix including a sequence of attributes; and alter the sequence of attribute values constituting the second query data based on the permuted sequence of attributes, wherein the second permuted query data is obtained based on the alteration.

13. The system according to claim 11, wherein the first processor is further configured to apply the additive secret sharing function on the second permuted query data to split the second permuted query data into two parts, wherein the split leads to the generation of the first share of the second permuted query data and the second share of the second permuted query data.

14. The system according to claim 11, wherein the first processor is further configured to generate the first seed such that an application of the pseudo-random generator (PRNG) on the first seed by the second device leads to a generation of a first element of the second share of the second permuted query data, wherein an application of the PRNG on the first element leads to a generation of a second element of the second share of the second permuted query data, and wherein an application of the PRNG on a second-last element of the second permuted query data leads to a generation of a last element of the second share of the second permuted query data.

15. The system according to claim 11, wherein an accumulation of each element in the first share of the attribute-targeting vector associated with a non-leaf node of the first share of the permuted decision tree and a corresponding element in the second share of the attribute-targeting vector associated with a corresponding non-leaf node of the second share of the permuted decision tree is equal to an element in the attribute-targeting vector associated with a non-leaf node of the permuted decision tree, wherein the permuted decision tree is split for obtaining the first share of the permuted decision tree and the second share of the permuted decision tree, and wherein the attribute-targeting vector associated with the non-leaf node of the permuted decision tree is indicative of a position of an attribute, to which the non-leaf node of the permuted decision tree and the corresponding non-leaf node of the permuted decision tree are associated, in the sequence of attributes.

16. The system according to claim 11, wherein the first processor is further configured to compute a first share of a dot product associated with a non-leaf node of the set of non-leaf nodes of the first share of the permuted decision tree, wherein the set of non-leaf nodes of the permuted decision tree are included in a path from a root node of the permuted decision tree to a leaf node of the first share of the permuted decision tree to be traversed to obtain the second classification result, wherein the computing of the first share of the dot product associated with the non-leaf node of the set of non-leaf nodes of the first share of the permuted decision tree comprises:

obtaining of a first share of the attribute-targeting vector associated with the non-leaf node of the permuted decision tree and the first share of the second permuted query data;

masking of the first share of the attribute-targeting vector by use of a first share of a first beaver triple and masking the first share of the second permuted query data by use of a first share of a second beaver triple;

reception of a first share of a third beaver triple, a masked version of a second share of the attribute-targeting vector associated with a corresponding non-leaf node of the permuted decision tree of the set of corresponding non-leaf nodes of the permuted decision tree and a masked version of the second share of the second permuted query data, wherein the set of corresponding non-leaf nodes of the permuted decision tree are included in a corresponding path from a root to a leaf node of the second share of the permuted decision tree to be traversed to obtain the second classification result, and wherein the second device masks the second share of the attribute-targeting vector associated with the corresponding non-leaf node of the permuted decision tree by use of a second share of the first beaver triple and masks the second share of the second permuted query data by use of a second share of the second beaver triple, and wherein the first share of the third beaver triple is generated based on the first share of the first beaver triple, the second share of the second beaver triple, and a constant; and computation of the first share of the dot product associated with the non-leaf node of the permuted decision tree based on the first share of the attribute-targeting vector associated with the non-leaf node of the permuted decision tree, the first share of the second permuted query data, the masked version of the second share of the attribute-targeting vector associated with the corresponding non-leaf node of the permuted decision tree, the masked version of the second share of the second permuted query data, the first share of the second beaver triple, and the first share of the third beaver triple.

17. The system according to claim 16, wherein the first processor is further configured to transmit, to the second device, a masked version of the first share of the attribute-targeting vector associated with the non-leaf node of the permuted decision tree and a masked version of the first share of the second permuted query data, wherein computation of a second share of a dot product associated with the corresponding non-leaf node of the second share of the permuted decision tree by the second device comprises:

reception of a second share of the third beaver triple, the masked version of the first share of the attribute-targeting vector associated with the non-leaf node of the permuted decision tree, and the masked version of the first share of the second permuted query data, wherein the second share of the third beaver triple is generated based on the second share of the first beaver triple, the first share of the second beaver triple, and the constant, and computation of the second dot product associated with the corresponding non-leaf node of the permuted decision tree based on the second share of the attribute-targeting vector associated with the corresponding non-leaf node of the permuted decision tree, the second share of the second permuted query data, the masked version of the first share of the attribute-targeting vector associated with the non-leaf node of the permuted decision tree, the masked version of the first share of the second permuted query data, the second share of the second beaver triple, and the second share of the third beaver triple.

18. The system according to claim 11, wherein the first processor is further configured to:

compute a first share of a threshold associated with a root node of the set of non-leaf nodes of the first share of the permuted decision tree based on an application of the PRNG on the second seed, wherein a second share of the threshold associated with a corresponding root node of the set of corresponding non-leaf nodes of the second share of the permuted decision tree is stored in the second device;

compute a first share of a threshold associated with a first non-leaf node of the set of non-leaf nodes of the permuted decision tree by applying the PRNG on a portion of the first share of the threshold associated with the root node, wherein the first non-leaf node of the permuted decision tree is a child node of the root node, wherein a second share of the threshold associated with a corresponding first non-leaf node of the set of corresponding non-leaf nodes of the second share of the permuted decision tree is stored in the second device, and wherein the corresponding first non-leaf node of the permuted decision tree is a child node of the corresponding root node of the permuted decision tree; and compute a first share of a threshold associated with a second non-leaf node of the set of non-leaf nodes of the permuted decision tree by applying the PRNG on a portion of a first share of a threshold associated with a parent node of the second non-leaf node of the permuted decision tree, wherein the second non-leaf node of the permuted decision tree is a parent of a leaf node of the first share of the permuted decision tree, wherein the second non-leaf node of the permuted decision tree is included in the set of non-leaf nodes of the permuted decision tree, wherein a second share of the threshold associated with a corresponding second non-leaf node of the set of corresponding non-leaf nodes of the second share of the permuted decision tree is stored in the second device, wherein the corresponding second non-leaf node of the permuted decision tree is a parent of a corresponding leaf node of the second share of the permuted decision tree, and wherein the corresponding second non-leaf node of the permuted decision tree is included in the set of corresponding non-leaf nodes of the permuted decision tree.

19. The system according to claim 18, wherein the first processor is further configured to:

transmit a masked version of the first share of the threshold associated with the root node of the first share of the permuted decision tree and a masked version of a first share of a dot product associated with the root node of the first share of the permuted decision tree, wherein the masked version of the first share of the threshold associated with the root node of the permuted decision tree and the masked version of the first share of the dot product associated with the root node of the permuted decision tree are obtained based on a first share of a mask variable, wherein the second device performs the second secure comparison operation by comparing an accumulation of the masked version of the first share of the threshold associated with the root node of the permuted decision tree and a masked version of the second share of the threshold associated with the corresponding root node of the permuted decision tree with an accumulation of the masked version of the first share of the dot product associated with the root node of the permuted decision tree and a masked version of a second share of the dot product associated with the corresponding root node of the second permuted decision tree, wherein the masked version of the second share of the threshold associated with the corresponding root node of the permuted decision tree and the masked version of the second share of the dot product associated with the corresponding root node of the permuted decision tree are obtained based on a second share of the mask variable, and wherein the second device selects the corresponding first non-leaf node of the permuted decision tree, which is the child node of the corresponding root node of the permuted decision tree, based on an outcome of the second secure comparison operation;

receive the outcome of the second secure comparison operation from the second device; and select the first non-leaf node of the permuted decision tree, which is the child node of the root node of the permuted decision tree, and the portion of the first share of the threshold associated with the root based on the outcome of the second secure comparison operation.

20. The system according to claim 18, wherein the first processor is further configured to:

transmit a masked version of the first share of the threshold associated with the second non-leaf node of the first share of the permuted decision tree and a masked version of a first share of a dot product associated with the second non-leaf node of the first share of the permuted decision tree, wherein the masked version of the first share of the threshold associated with the second non-leaf node of the permuted decision tree and the masked version of the first share of the dot product associated with the second non-leaf node of the permuted decision tree are obtained based on a first share of a mask variable, wherein the second device performs the second secure comparison operation by comparing an accumulation of the masked version of the first share of the threshold associated with the second non-leaf node of the permuted decision tree and a masked version of the second share of the threshold associated with the corresponding second non-leaf node of the permuted decision tree with an accumulation of the masked version of the first share of the dot product associated with the second non-leaf node of the permuted decision tree and a masked version of a second share of the dot product associated with the corresponding second non-leaf node of the second share of the permuted decision tree, wherein the masked version of the second share of the threshold associated with the corresponding second non-leaf node of the permuted decision tree and the masked version of the second share of the dot product associated with the corresponding second non-leaf node of the permuted decision tree are obtained based on a second share of the mask variable, wherein the second device selects the corresponding leaf node of the permuted decision tree, which is a child node of the corresponding second non-leaf node of the permuted decision tree, based on an outcome of the second secure comparison operation, and wherein the second device determines the second share of the second classification result based on a label associated with the corresponding leaf node of the permuted decision tree stored in the corresponding leaf node of the permuted decision tree;

receive the outcome of the second secure comparison operation and the second share of the second classification result from the second device;

select the leaf node of the permuted decision tree, which is a child node of the second non-leaf node of the permuted decision tree, and a portion of the first share of the threshold associated with the second non-leaf node of the permuted decision tree based on the outcome of the second secure comparison operation; and determine the first share of the second classification result by applying the PRNG on the portion of the first threshold associated with the second non-leaf node of the permuted decision tree, wherein a result of the application of the PRNG is a label associated with the leaf node of the permuted decision tree.

21. A system comprising a first device and a second device, wherein the second device comprising a second processor, the second processor configured to:

execute, iteratively, a set of steps for traversing a decision tree until a leaf node is encountered, wherein the set of steps comprises:

receive, from the first device, a masked version of a permuted hash vector and masked versions of a first share of a hash value of an attribute field associated with a non-leaf node of a first share of the decision tree, wherein the first device generates the permuted hash vector by randomly permuting a hash vector generated by the first device, wherein the hash vector comprises hash values of all attribute fields whose values are included in a query data, and wherein the query data is generated by the first device, generate an attribute-targeting vector based on the masked version of the permuted hash vector, the masked versions of the first share of the hash value of the attribute field associated with the non-leaf node of the first share of the decision tree, and a second share of the hash value of the attribute field associated with a corresponding non-leaf node of a second share of the decision tree, apply the additive secret sharing function on the attribute-targeting vector for generation of the first share of the attribute-targeting vector associated with the non-leaf node and the second share of the attribute-targeting vector associated with the corresponding non-leaf node, wherein an accumulation of the first share of the attribute-targeting vector associated with the non-leaf node and the second share of the attribute-targeting vector associated with the corresponding non-leaf node results in the attribute-targeting vector, generate, from the attribute-targeting vector, the first share of the attribute-targeting vector associated with the non-leaf node and a second share of the attribute-targeting vector associated with the corresponding non-leaf node, transmit the first share of the attribute-targeting vector associated with the non-leaf node to the first device, receive a second share of a permuted query data from the first device, wherein the first share of the permuted query data is stored in the first device, wherein the first device obtains the permuted query data by randomly permuting the query data, and wherein the first share of the permuted query data and the second share of the permuted query data are generated from the query data, compute a second share of a dot product of the attribute-targeting vector and the permuted query data based on-the second share of the attribute-targeting vector and the second share of the permuted query data, wherein the first device computes a first share of the dot product based on the first share of the attribute-targeting vector and the first share of the permuted query data, perform a secure comparison operation based on masked versions of each of the first share of the dot product, a first share of a threshold associated with the non-leaf node, the second share of the dot product, and a second share of the threshold associated with a corresponding non-leaf node of the second share of the decision tree, wherein, at a first iteration, the non-leaf node is a root node of the first share of the decision tree and the corresponding non-leaf node is a root node of the second share of the decision tree, select a second child node of the corresponding non-leaf node based on the outcome of the secure comparison operation, wherein the second child node is the corresponding non-leaf node of the second share of the decision tree at a subsequent iteration, and wherein the second child node is a corresponding second leaf node of the second share of the tree selected at a final iteration, and transmit the outcome of the secure comparison operation to the first device, wherein the first device selects a first child node of the non-leaf node based on the outcome of the secure comparison operation, wherein the first child node is the non-leaf node of the first share of the decision tree at the subsequent iteration, and wherein the first child node is a first leaf node of the first share of the decision tree selected at the final iteration; and transmit, to the first device, a second share of a classification result generated based on a label associated with the corresponding second leaf node, wherein the first device generates a first share of a classification result based on a label associated with the first leaf node, and wherein the first device further generates a decision tree classification result from the first share of the classification result and the second share of the classification result, wherein the first device generates the first share of the classification result by applying a pseudo-random generator (PRNG) on a seed received from a third device to compute the label associated with the first leaf node of the first share of the decision tree.

22. The system according to claim 21, wherein the second processor is further configured to:

receive a first seed from the first device;

generate a second share of a second permuted query data using the first seed, wherein the first device generates a first share of the second permuted query data and the second share of the second permuted query data based on application of additive secret sharing on the second permuted query data, wherein the first device generates the second permuted query data from a second query data comprising a sequence of attribute values, and wherein the sequence of attribute values is altered based on a permutation matrix to generate the second permuted query data;

receive, from the third device, a second share of an attribute-targeting vector associated with each corresponding non-leaf node of a second share of a permuted decision tree, wherein the first device receives, from the third device, a first share of the attribute-targeting vector associated with each non-leaf node of a first share of the permuted decision tree;

compute second shares of dot products associated with a set of corresponding non-leaf nodes of the second share of the permuted decision tree based on second shares of the attribute-targeting vectors associated with the set of corresponding non-leaf nodes of the permuted decision tree and the second share of the second permuted query data, wherein the first device computes first shares of the dot products associated with a set of non-leaf nodes of the first share of the permuted decision tree based on first shares of the attribute-targeting vectors associated with the set of non-leaf nodes of the permuted decision tree and the first share of the second permuted query data;

receive second shares of thresholds associated with the set of corresponding non-leaf nodes of the second share of the permuted decision tree from the third device, wherein the first device receives a second seed from the third device, and wherein the first device uses the second seed to compute first shares of the thresholds associated with the set of non-leaf nodes of the first share of the permuted decision tree;

receive masked versions of the first shares of the thresholds associated with the set of non-leaf nodes of the permuted decision tree and masked versions of the first shares of the dot products associated with the set of non-leaf nodes of the permuted decision tree;

generate a second share of a second classification result based on outcomes of a second secure comparison operations, wherein the second secure comparison operations are performed based on masked versions of each of the first shares of the thresholds associated with the set of non-leaf nodes of the permuted decision tree, the first shares of the dot products associated with the set of non-leaf nodes of the permuted decision tree, the second shares of the thresholds associated with the set of corresponding non-leaf nodes of the permuted decision tree, and the second shares of the dot products associated with the set of corresponding non-leaf nodes of the permuted decision tree; and transmit the second share of the second classification result and the outcomes of the second secure comparison operations to the first device, wherein the first device generates a first share of the second classification result based on the outcomes of the second secure comparison operations, and wherein the first device generates a decision tree second classification result based on the first share of the second classification result and the second share of the second classification result.

23. A method implemented in a system that comprises a first device and a second device, the method comprising:

generating a hash vector comprising hash values of all attribute fields whose values are included in a query data;

executing, iteratively, a set of steps for traversing a decision tree until a leaf node is encountered, wherein the set of steps comprises:

permuting each of the query data and the hash vector randomly to generate a permuted query data and a permuted hash vector, transmitting, to the second device, a masked version of the permuted hash vector and masked versions of a first share of a hash value of an attribute field associated with a non-leaf node of a first share of the decision tree, receiving a first share of an attribute-targeting vector associated with the non-leaf node from the second device, wherein generation of the first share of the attribute-targeting vector associated with the non-leaf node is based on the masked version of the permuted hash vector and the masked versions of the first share of the hash value of the attribute field, transmitting a second share of the permuted query data to the second device, wherein a first share of the permuted query data and the second share of the permuted query data are generated based on application of an additive secret sharing function on the permuted query data, computing a first share of a dot product of the attribute-targeting vector and the permuted query data based on the first share of the attribute-targeting vector associated with the non-leaf node and the first share of the permuted query data, wherein the second device computes a second share of the dot product based on a second share of the attribute-targeting vector associated with a corresponding non-leaf node of a second share of the decision tree and the second share of the permuted query data, receiving, from the second device, an outcome of a secure comparison operation performed based on masked versions of each of the first share of the dot product, a first share of a threshold associated with the non-leaf node, the second share of the dot product, and a second share of the threshold associated with the corresponding non-leaf node, wherein, at a first iteration, the non-leaf node is a root node of the first share of the decision tree and the corresponding non-leaf node is a root node of the second share of the decision tree, and selecting a first child node of the non-leaf node based on the outcome of the secure comparison operation, wherein a second child node of the corresponding non-leaf node is selected based on the outcome of the secure comparison operation, wherein, at a subsequent iteration, the first child node is the non-leaf node of the first share of the decision tree and the second child node is the corresponding non-leaf node of the second share of the decision tree, wherein the first child node is a first leaf node of the first share of the decision tree selected at a final iteration, and wherein the second child node is a corresponding second leaf node of the second share of the decision tree selected at the final iteration;

generating a first share of a classification result based on a label associated with the first leaf node;

receiving, from the second device, a second share of the classification result generated based on a label associated with the corresponding second leaf node stored in the corresponding second leaf node; and generating a decision tree classification result based on the first share of the classification result and the second share of the classification result, wherein the method further comprises:

generating the masked version of the permuted hash vector by masking each element of the permuted hash vector by a unique mask variable; and generating masked versions of the first share of the hash value of the attribute field associated with the non-leaf node of the first share of the decision tree using the unique mask variable, wherein, upon reception of the masked version of the permuted hash vector and the masked versions of the first share of the hash value of the attribute field associated with the non-leaf node of the first share of the decision tree, the method further comprises:

generating, by the second device, the attribute-targeting vector based on the masked version of the permuted hash vector, the masked versions of the first share of the hash value of the attribute field associated with the non-leaf node of the first share of the decision tree, and a second share of the hash value of the attribute field associated with the corresponding non-leaf node of the second share of the decision tree, applying, by the second device, the additive secret sharing function on the attribute-targeting vector for generation of the first share of the attribute-targeting vector associated with the non-leaf node and the second share of the attribute-targeting vector associated with the corresponding non-leaf node, wherein an accumulation of the first share of the attribute-targeting vector associated with the non-leaf node and the second share of the attribute-targeting vector associated with the corresponding non-leaf node results in the attribute-targeting vector, and transmitting, by the second device, the first share of the attribute-targeting vector associated with the non-leaf node to the first device, and computing, by the first device, a first share of a threshold associated with the root node of the first share of the decision tree and a first share of the hash value of an attribute field associated with the root node of the first share of the decision tree by applying a pseudo-random generator (PRNG) on a seed, wherein the seed is received from a third device, wherein a second share of the threshold associated with the root node of the second share of the decision tree and a second share of the hash value of the attribute field associated with the root node of the second share of the decision tree is stored in the second device.

24. The method implemented according to claim 23, wherein the method further comprises:

obtaining a second permuted query data from a second query data comprising a sequence of attribute values, wherein the sequence of attribute values is altered based on a permutation matrix to generate the second permuted query data;

generating two shares of the second permuted query data, wherein a first share of the second permuted query data is stored in the first device;

transmitting a first seed to the second device to enable the second device to generate a second share of the second permuted query data using the first seed;

receiving, from the third device, a first share of an attribute-targeting vector associated with each non-leaf node of a first share of a permuted decision tree, wherein the second device receives, from the third device, a second share of the attribute-targeting vector associated with each corresponding non-leaf node of a second share of the permuted decision tree;

computing first shares of dot products associated with a set of non-leaf nodes of the first share of the permuted decision tree based on first shares of attribute-targeting vectors associated with the set of non-leaf nodes of the permuted decision tree and the first share of the second permuted query data, wherein the second device computes second shares of the dot products associated with a set of corresponding non-leaf nodes of the second share of the permuted decision tree based on second shares of the attribute-targeting vectors associated with the set of corresponding non-leaf nodes of the permuted decision tree and the second share of the second permuted query data;

receiving a second seed received from the third device, wherein the second seed is used to compute first shares of thresholds associated with the set of non-leaf nodes of the first share of the permuted decision tree, and wherein second shares of the thresholds associated with the set of corresponding non-leaf nodes of the second share of the permuted decision tree are received by the second device from the third device;

receiving a second share of a second classification result and outcomes of a second secure comparison operations from the second device, wherein the second share of the second classification result is generated based on the outcomes of the second secure comparison operations, wherein the second secure comparison operations are performed based on masked versions of each of the first shares of the thresholds associated with the set of non-leaf nodes of the permuted decision tree, the first shares of the dot products associated with the set of non-leaf nodes of the permuted decision tree, the second shares of the thresholds associated with the set of corresponding non-leaf nodes of the permuted decision tree, and the second shares of the dot products associated with the set of corresponding non-leaf nodes of the permuted decision tree;

generating a first share of the second classification result based on the outcomes of the second secure comparison operations; and generating a decision tree second classification result based on the first share of the second classification result and the second share of the second classification result.

25. A system comprising:

a first device comprising a first processor;

a second device comprising a second processor; and a third device comprising a third processor, wherein the third processor is configured to:

obtain a decision tree, wherein each non-leaf node of the decision tree includes an attribute field, a hash value of the attribute field, and a threshold, split the decision tree into a first share of the decision tree and a second share of the decision tree, by dividing thresholds, hash values, and labels into additive shares, transmit a seed to the first device to enable the first device to compute each of first shares of thresholds associated with non-leaf nodes of the first share of the decision tree, a first share of a hash value of an attribute field associated with a non-leaf node of the first share of the decision tree, and first shares of labels associated with leaf nodes of the first share of the decision tree, by applying a pseudo-random generator (PRNG) on the seed, and transmit, to the second device, the second share of the decision tree that includes second shares of the thresholds associated with corresponding non-leaf nodes of the second share of the decision tree, a second share of a hash value of an attribute field associated with a corresponding non-leaf node of the second share of the decision tree, and second shares of labels associated with corresponding leaf nodes of the second share of the decision tree, wherein the first processor is further configured to:

generate a masked version of a permuted hash vector by masking each element of the permuted hash vector by a unique mask variable; and generate masked versions of the first share of the hash value of the attribute field associated with the non-leaf node of the first share of the decision tree using the unique mask variable, wherein, upon reception of the masked version of the permuted hash vector and the masked versions of the first share of the hash value of the attribute field associated with the non-leaf node of the first share of the decision tree, the second device is configured to:

generate an attribute-targeting vector based on the masked version of the permuted hash vector, the masked versions of the first share of the hash value of the attribute field associated with the non-leaf node of the first share of the decision tree, and the second share of the hash value of the attribute field associated with the corresponding non-leaf node of the second share of the decision tree, apply an additive secret sharing function on the attribute-targeting vector for generation of a first share of the attribute-targeting vector associated with the non-leaf node and a second share of the attribute-targeting vector associated with the corresponding non-leaf node, wherein an accumulation of the first share of the attribute-targeting vector associated with the non-leaf node and the second share of the attribute-targeting vector associated with the corresponding non-leaf node results in the attribute-targeting vector, and transmit the first share of the attribute-targeting vector associated with the non-leaf node to the first device, and wherein the first processor is further configured to compute a first share of a threshold associated with a root node of the first share of the decision tree and a first share of a hash value of an attribute field associated with the root node of the first share of the decision tree by applying the pseudo-random generator (PRNG) on the seed, wherein the seed is received from the third device, wherein a second share of the threshold associated with the root node of the second share of the decision tree and a second share of the hash value of the attribute field associated with the root node of the second share of the decision tree is stored in the second device.

26. The system according to claim 25, wherein the third processor is further configured to:

transmit an attribute sequence vector to the first device to enable the first device to generate a permuted query data, obtain a permuted decision tree, wherein each non-leaf node of the permuted decision tree is associated with an attribute, a threshold, and an attribute-targeting vector, split the permuted decision tree into a first share of the permuted decision tree and a second share of the permuted decision tree, transmit a first share of an attribute-targeting vector associated with each non-leaf node in the first share of the permuted decision tree to the first device and a second share of the attribute-targeting vector associated with each corresponding non-leaf node in the second share of the permuted decision tree to the second device, transmit a second seed to the first device to enable the first device to compute first shares of thresholds associated with a set of non-leaf nodes of the first share of the permuted decision tree and a first share of a label associated with a leaf node of the first share of the permuted decision tree, and transmit, to the second device, second shares of the thresholds associated with a set of corresponding non-leaf nodes of the second share of the permuted decision tree and a second share of the label associated with a corresponding leaf node of the second share of the permuted decision tree.

* * * * *